United States Patent [19]
Cobler et al.

[11] Patent Number: 5,681,523
[45] Date of Patent: Oct. 28, 1997

[54] MEDIUM MODULUS POLYETHYLENE FILM AND FABRICATION METHOD

[75] Inventors: Brad A. Cobler, Lake Jackson; Larry D. Cady, Houston; Lisa E. Dodson; Osborne K. McKinney, both of Lake Jackson, all of Tex.

[73] Assignee: The Dow Chemical Company, Midland, Mich.

[21] Appl. No.: 469,838

[22] Filed: Jun. 6, 1995

Related U.S. Application Data

[62] Division of Ser. No. 239,495, May 9, 1994, abandoned.

[51] Int. Cl.$^6$ .................... B29C 49/16; C08L 23/08
[52] U.S. Cl. .................... 264/565; 428/220; 525/240
[58] Field of Search .................... 525/240; 264/176.1, 264/565; 428/220

[56] References Cited

U.S. PATENT DOCUMENTS

| | | |
|---|---|---|
| 2,983,704 | 5/1961 | Roedel . |
| 3,231,636 | 1/1966 | Snyder et al. . |
| 3,340,328 | 9/1967 | Brindell et al. . |
| 3,974,241 | 8/1976 | Lundberg . |
| 3,998,914 | 12/1976 | Lillis et al. . |
| 4,205,021 | 5/1980 | Morita et al. . |
| 4,230,831 | 10/1980 | Sakurai et al. . |
| 4,243,619 | 1/1981 | Fraser et al. . |
| 4,330,639 | 5/1982 | Matsuura et al. .......... 525/240 |
| 4,346,834 | 8/1982 | Mazumdar . |
| 4,390,573 | 6/1983 | Bullard et al. . |
| 4,438,238 | 3/1984 | Fukushima et al. .......... 525/240 |
| 4,461,873 | 7/1984 | Bailey et al. . |
| 4,465,812 | 8/1984 | Moriguchi et al. . |
| 4,547,551 | 10/1985 | Bailey et al. . |
| 4,632,801 | 12/1986 | Dowd .......... 264/566 |
| 4,770,912 | 9/1988 | Furrer et al. . |
| 4,786,688 | 11/1988 | Thiersault et al. .......... 525/240 |
| 4,801,652 | 1/1989 | Mizutani et al. .......... 525/240 |
| 4,824,912 | 4/1989 | Su . |
| 4,828,906 | 5/1989 | Nishimura et al. . |
| 4,954,391 | 9/1990 | Katani et al. .......... 428/220 |
| 4,957,972 | 9/1990 | Shirodkar . |
| 5,026,610 | 6/1991 | Harrison . |
| 5,028,663 | 7/1991 | Chung . |
| 5,041,501 | 8/1991 | Shirodkar . |
| 5,047,468 | 9/1991 | Lee et al. . |
| 5,091,228 | 2/1992 | Fujii et al. . |
| 5,102,955 | 4/1992 | Calabro et al. . |
| 5,153,039 | 10/1992 | Porter et al. . |
| 5,189,106 | 2/1993 | Morimoto et al. . |
| 5,206,075 | 4/1993 | Hodgson .......... 428/216 |
| 5,242,922 | 9/1993 | Shirodkar . |
| 5,258,161 | 11/1993 | Ealer . |
| 5,272,236 | 12/1993 | Lai et al. .......... 526/348.5 |
| 5,278,272 | 1/1994 | Lai et al. . |
| 5,288,531 | 2/1994 | Falla et al. .......... 525/240 |

FOREIGN PATENT DOCUMENTS

| | | |
|---|---|---|
| 0607783A2 | 7/1994 | European Pat. Off. . |
| 58-222131 | 12/1983 | Japan . |
| 61-009446 | 1/1986 | Japan . |
| 94/03414 | 4/1990 | WIPO . |
| 94/07930 | 4/1990 | WIPO . |
| 94/06857 | 9/1992 | WIPO . |
| 94/12568 | 6/1994 | WIPO . |
| 94/28064 | 12/1994 | WIPO . |

OTHER PUBLICATIONS

Plastics World—"LLDPE Blends Perk Up Performance of PE Films" Dec. 1982 – pp. 40–43.
Modern Plastics–1963ED–1962–p. 227.
Derwent AN –94–236606/29.
Japanese Abstract JP 58–222131 (Dec. 23, 1983).
Japanese Abstract JP 61–009446 (Jan. 17, 1986).

*Primary Examiner*—D. R. Wilson

[57] ABSTRACT

Medium modulus, polyethylene films and bags with improved tear performance are made for heavy-duty packaging applications and hot-fill uses. Film compositions contain high molecular weight linear polyethylene and linear ethylene/α-olefin interpolymer. The film is at least about 1.25 mils (31 microns) thick and is characterized as having a calculated film density in the range of about 0.923 to about 0.95 grams/cubic centimeter (g/cc) and typically has a tear strength or impact resistance at least 30 percent greater than current industrial polyethylene film. The novel film has superior dimensional stability and strength properties which allow significant down-gauging relative to industrial films used as heavy-duty overwraps, sleeves and bags.

2 Claims, 9 Drawing Sheets

♦ Linear Heterogenous Polymer
■ Substantially Linear Polymer
○ Linear Homogeneous Polymer

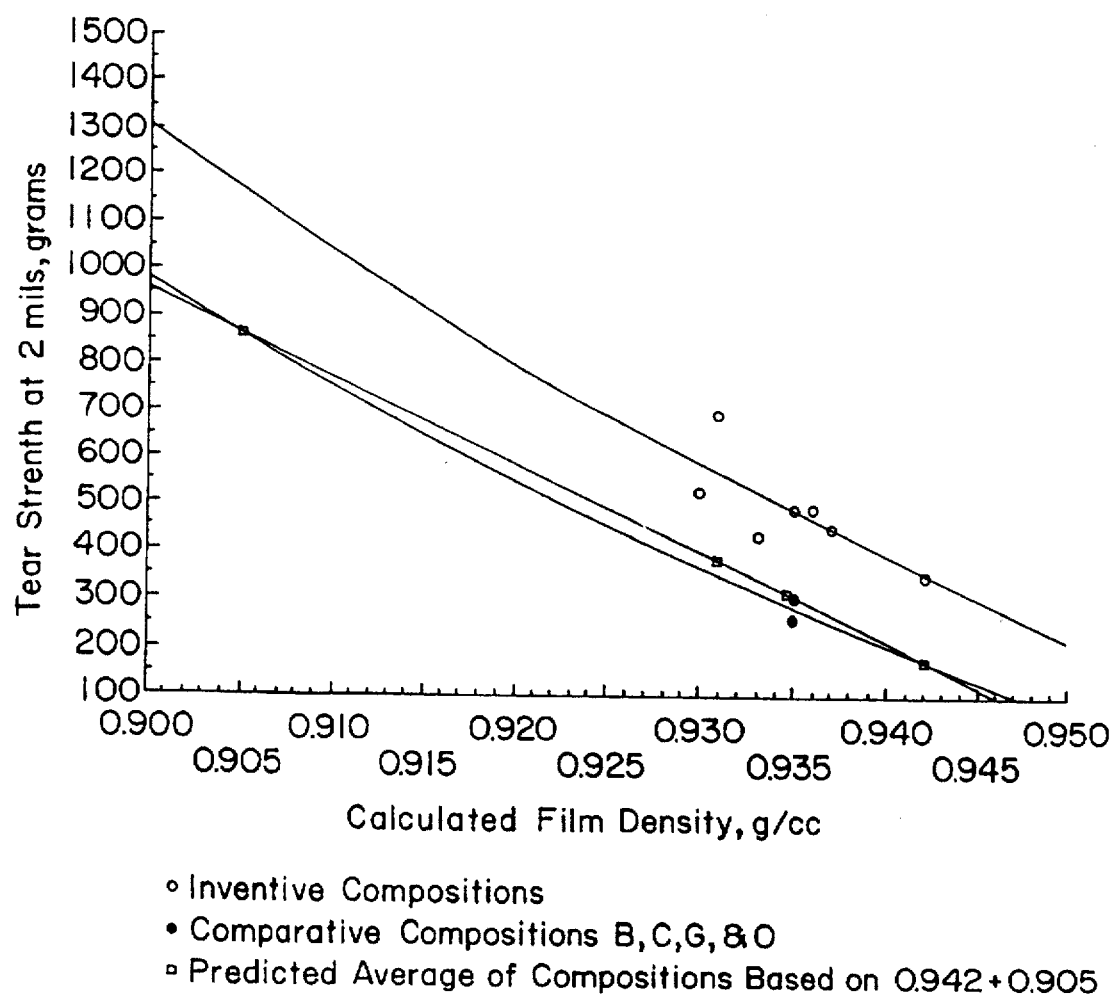

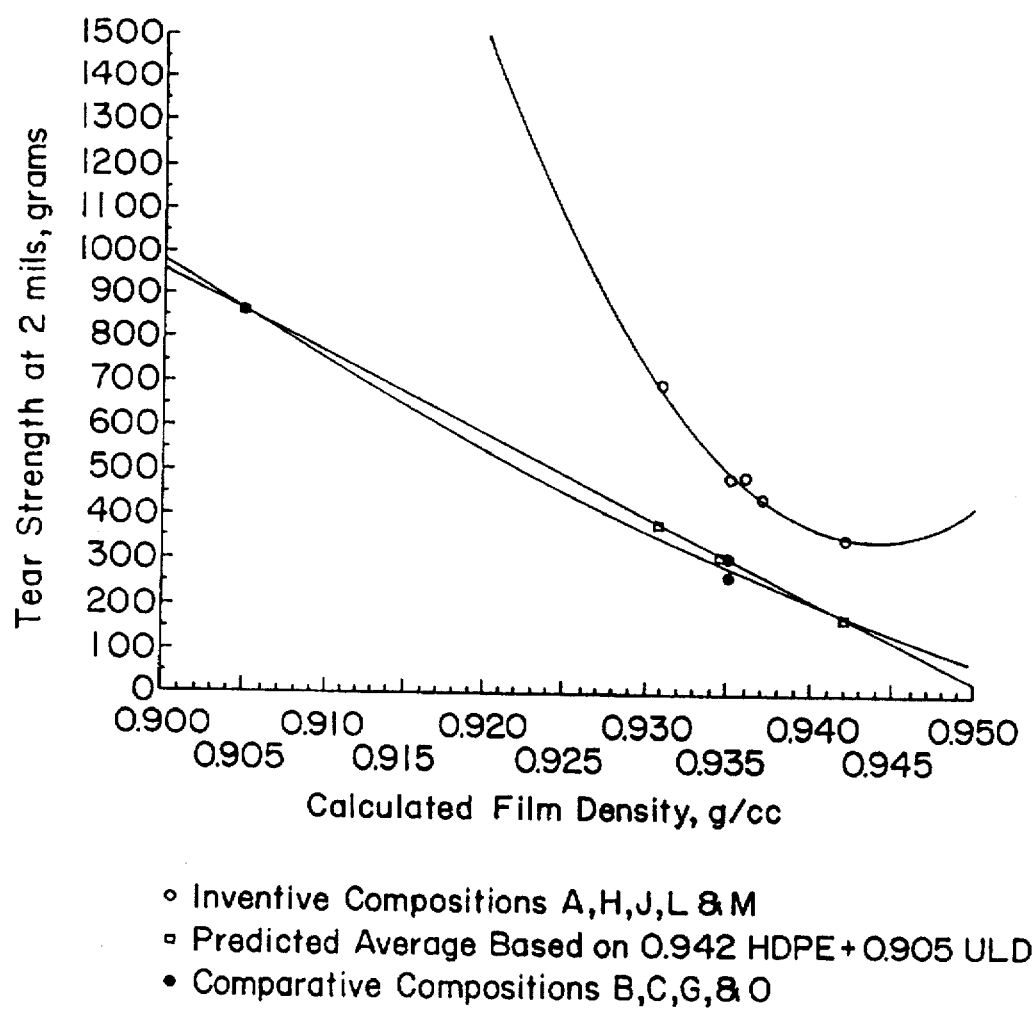

MEDIUM MODULUS POLYETHYLENE FILM AND FABRICATION METHOD

CROSS-REFERENCE TO RELATED APPLICATIONS

This application is a divisional of U.S. patent application Ser. No. 08/239,495, filed on May 9, 1994, now abandoned, in the names of Brad A. Cobler, Larry D. Cady, Lisa E. Dodson and Osborne K. McKinney. This application is related to the application entitled "Medium Modulus Film Comprising Substantially Linear Polyethylene and Fabrication Method" filed herewith on May 9, 1994, in the names of Jeffrey J. Wooster, Brad A. Cobler, Larry D. Cady, David Bertelsman, Lisa E. Dodson and Osborne K. McKinney and to application Ser. No. 08/054,379, now abandoned, filed Apr. 28, 1993 in the names of Pak-Wing S. Chum, Ronald P. Markovich, George W. Knight and Shih-Yaw Lai.

FIELD OF THE INVENTION

This invention pertains to a medium modulus polyethylene film and a method for preparing such film. The novel film can be prepared by variable-stalk blown extrusion. The film has high tear and impact properties. The film can be used in heavy-duty packaging and shipping applications and also in hot-fill packaging applications.

BACKGROUND OF THE INVENTION

Polyethylene films with high tear and impact properties are needed for packaging and shipping heavy items, such as building and construction materials, lawn and garden materials, salt, polymer pellets, and the like. Heavy-duty films and bags must also possess good rigidity and stiffness (modulus). Good film strength properties are required to prevent bag ruptures and product losses during distribution while the rigidity and stiffness provide good dimensional stability. Dimensional stability is important during fabrication and packaging operations because it assists in maintaining the correct positioning of the film or bag as it is conveyed through the various equipment stations during bag-making and product-filling operational steps. Dimensional stability at elevated temperatures during the product-filling step is also required in some instances when the product (e.g., salt) is packaged hot such as, for example, in some form-fill-seal packaging operations.

Heavy-duty packaging currently involves monolayer and multilayer polyethylene films having a calculated film density as low as about 0.920 g/cc. Typical polyethylene film compositions for heavy-duty packaging include (a) blends of linear low density polyethylene (LLDPE) with low density polyethylene (LDPE), (b) high density polyethylene (HDPE) modified by adding rubber and other elastomers (e.g., polybutylene) to impart impact resistance, (c) LLDPE blended with a low molecular weight, high density polyethylene (LMW-HDPE), (d) LLDPE blended with a high melt flow rate HDPE, or (e) LLDPE blended with partially isotactic polymers. See, for example, U.S. Pat. No. 5,041,401 by Shirodkar et al., U.S. Pat. No. 5,102,955 by Calabro et al. and U.S. Pat. No. 4,828,906 by Nishimura et al. Also known is the polyethylene composition disclosed by Thiersault et al. in U.S. Pat. No. 4,786,688 which contains 80 to 98 percent by weight HDPE and 2 to 20 percent by weight LLDPE which is alleged to be useful for thin film (20 microns) and blow molding applications. Additionally, ternary polymer blends have been used in this packaging application. For example, in U.S. Pat. No. 4,824,912, Su et al. disclose LLDPE blended with minor amounts of a low molecular weight HDPE (LMW-HDPE) and a high molecular weight HDPE (HMW-HDPE) for processability and film property improvements over LLDPE used alone. The disclosures of all of the above-cited patents are incorporated herein by reference.

The prior art shows that the linear ethylene polymers currently used in making polyethylene films provide increased tear strength as density increases to about 0.920 g/cc and then show substantially lower tear strengths as density increases above about 0.920 g/cc. Attempts to improve tear strength by increasing film thickness have been only marginally effective. When film thickness is increased to improve strength properties, the rigidity of present art polyethylene films increases disproportionately to impact and tear resistance properties, and thereby thicker films offer practitioners little or no additional benefit. Thus, although a variety of polyethylene films and film compositions are known, prior art polyethylene films are not completely satisfactory for use in heavy-duty packaging applications because they do not offer the desired balance of high tear and impact resistance at the required film rigidity or modulus and/or they do not have the desired dimensional stability.

Hence, it is an object of the present invention to provide a polyethylene film with improved tear strength and impact resistance and good dimensional stability, as well as a method for making the same, which can be used in heavy-duty packaging and shipping applications and for use in hot fill packaging applications.

SUMMARY OF THE INVENTION

Applicants have discovered a medium modulus, polyethylene film having high impact and tear properties and a method for preparing such film. The novel film comprises:

(A) from about 60 to about 95 weight percent, based on the combined weights of Components (A) and (B), of at least one high weight molecular linear ethylene polymer having a density in the range of about 0.92 to about 0.96 g/cc and an $I_5$ melt index in the range of about 0.1 to about 3 g/10 minutes, and (B) from about 5 to about 40 weight percent, based on the combined weights of Components (A) and (B), of at least one linear ethylene/α-olefin interpolymer characterized as containing at least one α-olefin monomer and having a density in the range of about 0.85 to about 0.92 g/cc and an $I_2$ melt index in the range of 0.3 to about 3 g/10 minutes.

The novel method for producing such medium modulus polyethylene is a variable-stalk extrusion process which comprises the steps of:

(1) providing an extrudable thermoplastic composition containing (A) from about 60 to about 95 weight percent, based on the combined weight of Components (A) and (B), of at least one high weight molecular linear ethylene polymer having a density in the range of about 0.92 to about 0.96 g/cc and an $I_5$ melt index in the range of about 0.1 to about 3 g/10 minutes, and (B) from about 5 to about 40 weight percent, based on the combined weight of Components (A) and (B), of at least one linear ethylene/α-olefin interpolymer characterized as containing at least one α-olefin monomer and having a density in the range of about 0.85 to about 0.92 g/cc and an $I_2$ melt index in the range of 0.3 to about 3 g/10 minutes.

(2) introducing said composition of step (1) into a heated film extrusion apparatus equipped with an annular die, (3) extruding said composition through said annular die to form a molten or semi-molten thermoplastic tube of said composition that is subsequently blown-up and drawn-down through nip and take-off rollers to form a layflat film with a thickness greater than about 1.25 mils, and (4) conveying said film formed in step (3) for subsequent use down-line of the film extrusion apparatus of step (2) or collecting said film formed in step (3) for subsequent use off-line.

The film of the present invention has improved tear and impact performance and excellent dimensional stability that is not ordinarily expected for medium modulus, polyethylene films. The novel film has at least a 30 percent, and preferably 50 percent, improvement in impact and tear properties relative to prior art polyethylene films having about the same film density, melt index and film thickness. These improvements permit Practitioners to meet specified heavy-duty film requirements at substantially lower costs by down-gauging and/or by using higher diluent and recycled material loadings.

DESCRIPTION OF THE FIGURES

FIGS. 2–8 are used to graphically summarize data presented in the Examples.

FIG. 2 plots the relationship between tear strength and film thickness for an Inventive Film prepared from Film Composition A and for Comparative Films prepared from Film Compositions B, C and D.

FIG. 3 plots the relationship between tear strength and film thickness for an Inventive Film prepared from Film Composition A and for Comparative Films prepared from Film Compositions B, E and F.

FIG. 4 plots the relationship between tear strength and film thickness for Inventive Films prepared from Film Compositions A, H and I and for Comparative Films prepared from Film Composition G.

FIG. 5 plots the relationship between tear strength and film thickness for Inventive Films prepared from Film Composition A, J and K and for Comparative Films prepared from Film Compositions B and C.

FIG. 6 plots the relationship between tear strength and film thickness for Inventive Films prepared from Film Composition A, L and M and for Comparative Films prepared from Film Compositions B.

FIG. 7 plots the relationship between tear strength and film thickness for Inventive Films prepared from Film Composition A, H, I, J, K, L and M and for Comparative Films prepared from Film Compositions B, C, D, E, F and G and includes the linear regression equation for each composition.

FIG. 8 plots the relationship between tear strength and film density for Inventive Films prepared from Film Compositions A, H, I, J, K, L and M, and Comparative Films prepared from Film Compositions B, C, G and O as well as the calculated or predicted tear strength of blend compositions based on a 0.942 g/cc HMW-HDPE and a 0.905 g/cc ULDPE at various ratios.

FIG. 9 plots the relationship between tear strength and film density for Inventive Films prepared from preferred Film Compositions A, H, K, L and M, and Comparative Films prepared from Film Compositions B, C, G and O as well as the calculated or predicted tear strength of blend compositions based on a 0.942 g/cc HMW-HDPE and a 0.905 g/cc ULDPE at various ratios.

GLOSSARY AND TEST METHODS

Figure 1:
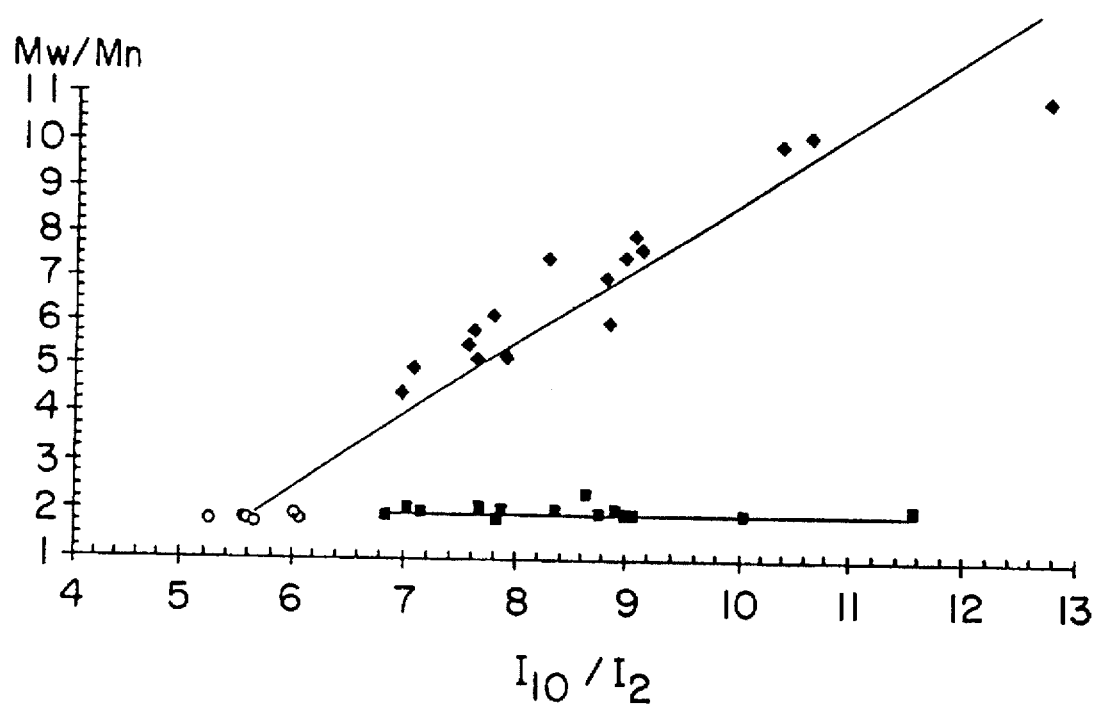
FIG. 1 plots data describing the relationship between Mw/Mn and I10/I2 for three distinct polymer types: substantially linear polyethylene, heterogeneous linear polyethylene and homogeneous linear polyethylene.

The terms "ultra low density polyethylene" (ULDPE), "very low density polyethylene" (VLDPE) and "linear low density polyethylene" (LVLDPE) have been used interchangeably in the polyethylene art to designate the polymer subset of linear low density polyethylenes having a density less than or equal to about 0.915 g/cc. The term "linear low density polyethylene" (LLDPE) is then applied to those linear polyethylenes having a density above about 0.915 g/cc.

The terms "heterogeneous" and "heterogeneously branched" are used herein in the conventional sense in reference to a linear ethylene/α-olefin polymer having a comparatively low short chain branching distribution index. The short chain branching distribution index (SCBDI) is defined as the weight percent of the polymer molecules having a comonomer content within 50 percent of the median total molar comonomer content. The short chain branching distribution index of polyolefins can be determined by well-known temperature rising elution fractionation techniques, such as those described by Wild et al., *Journal of Polymer Science, Poly. Phys. Ed.*, Vol. 20, p. 441 (1982), L. D. Cady, "The Role of Comonomer Type and Distribution in LLDPE Product Performance," SPE Regional Technical Conference, Quaker Square Hilton, Akron, Ohio, Oct. 1–2, pp. 107–119 (1985), or U.S. Pat. No. 4,798,081, the disclosures of all which are incorporated herein by reference. Heterogeneous linear ethylene/α-olefin polymers typically have a SCBDI less than about 30 percent.

The terms "homogeneous" and "homogeneously branched" are used herein in the conventional sense in reference to an ethylene/α-olefin polymer having a comparatively high short chain branching distribution index (SCBDI) as determined by well-known temperature rising elution fractionation techniques. Homogeneous ethylene/α-olefin polymers typically have a SCBDI greater than or equal to about 30 percent.

The term "medium modulus" is used herein in reference to the novel film to mean the calculated film density is in the range of about 0.923 to about 0.95 g/cc. The term "calculated film density" is used herein to mean the density of film when calculated from the known weight fractions and the measured annealed densities of the component polymers or layers.

The term "thick" is used herein in reference to the novel film to mean a film thickness greater than about 1.25 mils (31 microns).

The term "variable-stalk extrusion" is a new term of art used herein to express the distance between the annular film die and stalk height or bubble expansion point which can be varied from 0 inches (0 centimeters) to greater than 144 inches (366 centimeters) during blown film fabrication. The term includes both well-known pocket blown film extrusion and stalk blown film extrusion. The term "high stalk extrusion" is used herein in the conventional sense to mean a distance between the annular film die and the air ring that is greater than or equal to 30 inches (76 centimeters). The term "low stalk extrusion" is used herein in the conventional sense to mean a distance in the range of about 5 inches (12.7 centimeters) to about 30 inches (76 centimeters).

The term "hot-fill" herein refers to a packaging or product-filling operation where the product temperature is greater than 45° C. The term "heavy-duty" herein refers generally to industrial items packaged in bulk or having a single-package weight greater than 10 pounds (4.5 kilograms).

The density of the polymers used to make the medium modulus film of the present invention is measured in accordance with ASTM D-792 and is reported as grams/cubic centimeter (g/cc). The measurements reported in the Examples below are determined after the polymer samples have been annealed for 24 hours at ambient conditions.

Melt index measurements are performed according to ASTM D-1238, Condition 190° C./2.16 kilogram (kg) and Condition 190° C./5 kg, and are known as $I_2$ and $I_5$, respectively. Melt index is inversely proportional to the molecular weight of the polymer. Thus, the higher the molecular weight, the lower the melt index, although the relationship is not linear. Melt index is reported as g/10 minutes. For purposes of this invention, in calculating certain values in the Examples, $I_5$ and $I_2$ values roughly relate to one another by a factor of about 5.1; for example, a 1.0 $I_2$ index melt is equivalent to about a 5.1 $I_5$ melt index. Melt index determinations can also be performed with even higher weights, such as in accordance with ASTM D-1238, Condition 190° C./10 kg and Condition 190° C./21.6 kg, and are known as $I_{10}$ and $I_{21.6}$, respectively.

The term "melt flow ratio" as defined herein in the conventional sense as the ratio of a higher weight melt index determination to a lower weight determination. For measured $I_{10}$ and $I_2$ melt index values, the melt flow ratio is conveniently designated as $I_{10}/I_2$. For $I_{21.6}$ and $I_{10}$ values, the ratio is designated $I_{21.6}/I_{10}$. Other melt flow ratios are occasionally used respecting polyethylene compositions, such as, for example $I_5/I_2$ based and $I_5$ and $I_2$ melt index measurements. In general, $I_{21.6}/I_{10}$ and $I_5/I_2$ determinations provide similar melt flow values and $I_{10}/I_2$ values are usually greater than $I_{21.6}/I_{10}$ values by a factor of about 4.4 and this factor is used for purposes of this invention in calculating certain values in the Examples.

The tear resistance of the film of the present invention is measured in accordance with ASTM D1922 and is reported in grams. Tear resistance in measured both the machine direction (MD) and in the cross direction (CD). The term "tear strength" is used herein to represent the average between MD and CD tear resistance values and, likewise, is reported in grams. The impact resistance of the film of the instant invention is measured in accordance with ASTM D1709. Where indicated and according to the relationship of higher thicknesses yield increased performance values, tear and impact results are normalized to exactly 2 mils by proportionate increases or decreases based on actual measured (micrometer) film thickness; however, such normalization calculations are only performed and reported where thickness variations are less than 10 percent, i.e., where the measured thickness is in the range of about 1.8–2.2 mils.

DETAILED DESCRIPTION OF THE INVENTION

The medium modulus, polyethylene film of the present invention has a calculated film density in the range of about 0.923 g/cc to about 0.95 g/cc, especially, about 0.926 g/cc to about 0.948 g/cc, and more especially, about 0.93 g/cc to about 0.945.

The film thickness is generally greater than about 1.25 mil, especially, in the range of about 1.5 mil to about 8.75 mils, and more especially, in the range of about 2 mils to about 8 mils.

These films have a tear strength or, alternately, impact resistance, at least 30 percent greater than, and more preferably at least 50 percent greater than, the tear strength or impact resistance of a comparative prior art polyethylene film having about the same film density, melt index and film thickness.

Figure 7:
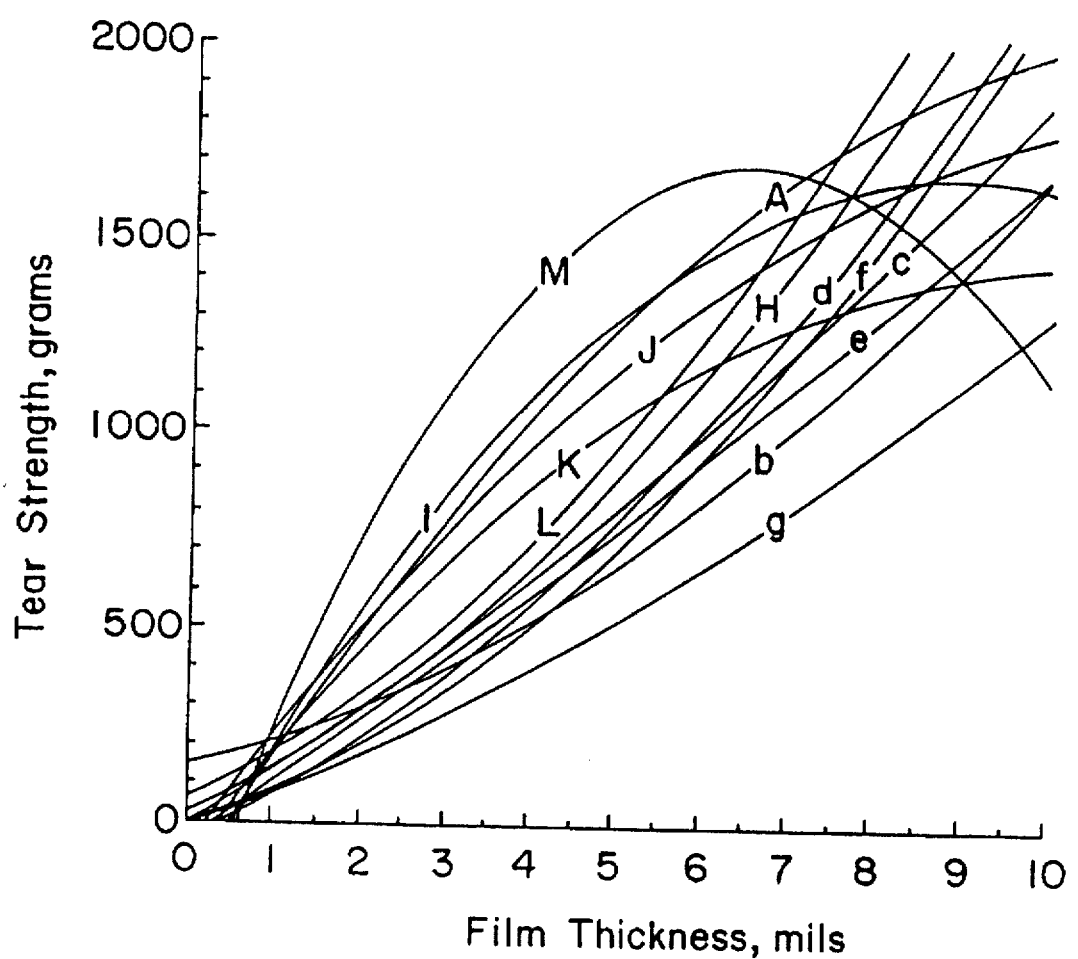

The tear strength of the novel film can be determined by the following equation:

$$\text{tear strength(grams)} = Ax + Bx^2 + C$$

where A, B and C are numerical values and x is film thickness, mils; when A is less than or equal to about 150, B is greater than or equal to about 12.5, preferably greater than or equal to about 13.5, and more preferably greater than or equal to about 14.5; and when A is greater than about 150, B is in the range of about −80 to about 40, preferably about −70 to about 20, and more preferably about −60 to about 0. For example, the expression $96.621x + 16.186x^2 + 59.767$ is thought to represent the tear strength of the film of the present invention, whereas the expression $138.22x + 4.8116x^2 - 19.364$ does not. These representative expressions or equations are film composition specific. FIG. 7 provides other example expressions based on film thickness that are representative of the film of the present invention.

The tear strength of the novel film can be determined by the following equation:

$$\text{tear strength(grams)} = (2.065 \times 10^6)(Z)^2 - (3.8983 \times 10^6)(Z) + 1.84015 \times 10^6$$

where Z is the calculated film density in g/cc.

This novel film can be conveniently formed into bags and is useful in heavy-duty packaging and shipping applications as well as in hot-fill packaging applications where films with a good property balance, i.e., high strength and medium modulus with good tear, impact and dimensional stability, are needed.

The high molecular weight linear ethylene polymers, Component (A), for use in preparing the medium modulus, polyethylene film of the instant invention are a known class of compounds which can be produced by any well-known particle-form polymerization process, such as slurry polymerization and gas phase polymerization. Preferably, the high molecular weight linear ethylene polymers are produced using well-known Phillips or Ziegler type coordination catalysts, although metallocene catalyst systems can also be used. Although preferred, with conventional Ziegler type catalysts, slurry polymerization processes are generally limited to polymer densities greater than about 0.940 g/cc and especially limited to polymer densities greater than about 0.935 g/cc, i.e., about 0.935 g/cc is the practical lower commercial limit for slurry polymerization.

The high molecular weight linear ethylene polymer can be an ethylene homopolymer or a copolymer of ethylene with at least one α-olefin of from 3 to 20 carbon atoms. However, preferably, the high molecular weight linear polymer is a copolymer with at least one $C_3$–$C_{20}$ α-olefin, such as 1-propylene, 1-butene, 1-isobutylene, 4-methyl-1-pentene, 1-hexene, 1-heptene and 1-octene. Most preferably, the high molecular weight linear ethylene polymer is an ethylene/1-butene copolymer prepared by a low pressure slurry polymerization process. The novel film comprises from about 60 to about 95 weight percent high molecular weight linear ethylene polymer, preferably about 65 to about 90 weight percent, and more preferably about 70 to about 85 weight percent.

Component (A) can also be a blend of linear ethylene polymers. Such blends can be prepared in-situ (e.g., by having a mixture of catalysts in a single polymerization reactor or by using different catalysts in separate reactors connected in parallel or in series) or by physical blending of polymers.

The high molecular weight linear ethylene polymer has an $I_5$ melt index in the range of about 0.1 g/10 minutes to about 3 g/10, preferably, about 0.1 g/10 minutes to about 2 g/10 minutes and, more preferably, about 0.15 g/10 minutes to about 1 g/10 minutes. Additionally, the linear polymer preferably has a bimodal molecular weight distribution (MWD) and an $I_{21.6}/I_{10}$ ratio in the range of from about 1 to about 12, preferably in the range of from about 3.5 to about 10, more preferably in the range of from about 4 to about 8, and most preferably in the range of from about 4.5 to about 6.

The high molecular weight linear ethylene polymer, which includes, but is not limited to, LLDPE, LMDPE and HDPE, and mixtures thereof, preferably has a density in the range of from about 0.92 g/cc to about 0.96 g/cc, more preferably, in the range of from about 0.93 g/cc to about 0.96 g/cc, and most preferably, in the range of from about 0.935 g/cc to about 0.958 g/cc.

The linear ethylene/α-olefin interpolymers useful in this invention are a known class of compounds which includes both conventional Ziegler catalyzed, heterogeneous branched, linear ethylene/α-olefin interpolymers as well as homogeneously branched linear ethylene/α-olefin interpolymers.

Heterogeneously branched ULDPE and LLDPE are well known and commercially available materials. They are typically prepared using Ziegler-Natta catalysts in solution or gas phase polymerization processes Anderson et al., U.S. Pat. No. 4,076,698, is illustrative. These traditional Ziegler-type linear polyethylenes are not homogeneously branched and they do not have any long-chain branching. Heterogeneously branched ULDPE and LLDPE typical having molecular weight distributions, $M_w/M_n$, in the range of from about 3.5 to about 4.1.

Homogeneously branched ULDPE and LLDPE are also well known. Elston disclosure in U.S. Pat. No. 3,645,992 is illustrative. Homogeneously branched ULDPE and LLDPE can be prepared in conventional polymerization processes using Ziegler-type catalysts such as, for example, zirconium and vanadium catalyst systems as well as using metallocene catalyst systems such as, for example, those based on hafnium. Ewen et al. disclosure in U.S. Pat. No. 4,937,299 and Tsutsui et al. disclosure in U.S. Pat. No. 5,218,071 are illustrative. The disclosures of Elston Ewen et al. and Tsutsui et al. are incorporated herein by reference. This second class of linear polyethylenes are homogeneously branched polymers, and like traditional Ziegler-type heterogeneous linear polyethylenes, they do not have any long-chain branching. Homogeneously branched ULDPE and LLDPE typical having molecular weight distributions, $M_w/M_n$, of about 2. Commercial examples of homogeneously branched linear polyethylenes include those sold by Mitsui Petrochemical Industries under the designation "TAFMER" and by Exxon Chemical Company under the designation "EXACT".

The linear ethylene/α-olefin interpolymers used in this invention are not in the same class of compounds as the a unique class of substantially linear ethylene polymers defined in U.S. Pat. No. 5,272,236 and U.S. Pat. No. 5,278,272 by Lai et al., both of which are incorporated herein by reference. The linear ethylene/α-olefin interpolymers used to make the novel film of this invention are distinguished from the unique polymers described by Lai et al. in that substantially linear ethylene/α-olefin interpolymers have excellent processability, even though they have relatively narrow molecular weight distributions (i.e., $M_w/M_n$ ratio typically is about 2). Even more surprisingly, as described in U.S. Pat. No. 5,278,272 by Lai et al., the melt flow ratio ($I_{10}/I_2$) of substantially linear ethylene polymers can be varied essentially independently of the polydispersity index (that is, the molecular weight distribution, $M_w/M_n$). As FIG. 1 illustrates, the rheological behavior of substantially linear ethylene/α-olefin polymers represents a dramatic contradistinction over the homogeneous linear ethylene/α-olefin polymer described by Elston and to conventional Ziegler polymerized heterogeneous linear polyethylene made, for example, according to the disclosure by Anderson et al. in U.S. Pat. No. 4,076,698, in that both heterogeneous linear and homogeneous linear ethylene/α-olefin polymers have rheological properties such that as the polydispersity index increases, the $I_{10}/I_2$ value also increases.

The linear ethylene/α-olefin interpolymer, component (B), for use in preparing the medium modulus, thick polyethylene film of the instant invention contains at least one α-olefin monomer. The interpolymer can be produced by solution and gas-phase polymerization processes. However, when produced by a gas-phase process and the interpolymer is a copolymer containing only one α-olefin, the α-olefin should be greater than $C_6$. When produced by the preferred solution process, the interpolymer can contain at least one $C_3$–$C_{20}$ α-olefin, such as 1-propylene, 1-butene, 1-isobutylene, 1-hexene, 4-methyl-1-pentene, 1-heptene and 1-octene, as well as other monomer types such as styrene, halo- or alkyl-substituted styrenes, tetrafluoro-ethylene, vinyl benzocyclo-butane, 1,4-hexadiene, 1,7-octadiene, and cycloalkenes, e.g., cyclopentene, cyclohexene and cyclooctene. Although the interpolymer can be a terpolymer where at least two α-olefin monomers are polymerized with ethylene, preferably the interpolymer is a copolymer with one α-olefin monomer copolymerized with ethylene and most preferably the linear ethylene/α-olefin interpolymer, Component (B), is a copolymer of ethylene and 1-octene.

The novel film is prepared using from about 5 to about 40 weight percent linear ethylene/α-olefin interpolymer, preferably from about 10 to about 35 weight percent, and more preferably from about 15 to about 30 weight percent.

The linear ethylene/α-olefin interpolymer used to prepared the film of the present invention has an $I_2$ melt index in the range of from about 0.3 g/10 minutes to about 3 g/10, preferably, from about 0.3 g/10 minutes to about 2.5 g/10 minutes and, more preferably, from about 0.4 g/10 minutes to about 2 g/10 minutes. The linear ethylene/α-olefin interpolymer has a density less about 0.92 g/cc, more preferably, in the range of from about 0.85 g/cc to about 0.916 g/cc, and most preferably, in the range of from about 0.86 g/cc to about 0.91 g/cc. The $I_{10}/I_2$ ratio of the linear ethylene/α-olefin interpolymers is in the range of from about 5.63 to about 30, preferably less than about 20, especially less than about 15, and most especially less than about 10.

The preparation of polyethylene film by blown film extrusion is well-known. See, for example, U.S. Pat. No. 4,632,801 by Dowd which described a typical blown film extrusion process. In the typical process, a polyethylene composition is introduced into a screw extruder wherein it is melted and composition is forced through an annular film die to form a molten tube. Air is then provided through the annular die to inflate the tube into a "bubble" with the desired diameter. Air is contained within the bubble by the annular die and nip rollers downstream of the die where thereafter the bubble is collapse into layflat film. The final thickness of the film is controlled by extrusion rate, bubble diameter and nip speed which can be controlled by such variables as screw speed, haul-off rate and winder speed. Increasing the extrusion rate at a constant bubble diameter and nip speed, will increase final film thickness.

The typical blown extrusion process can be generally classified as either "stalk" or "pocket" extrusion. In stalk extrusion, bubble inflation and expansion are controlled or occur at a significant distance above the annular die. The air ring, usually of single-lip construction, provides air flow external to the tube and parallel to the machine direction such that the molten tube maintains the approximate diameter of the annular film die until it is inflated at a height at least 5 inches (12.7 centimeters) above the annular die. Internal bubble cooling can also be used as well as an internal bubble stabilizer to insure optimum bubble stability during fabrication.

Stalk extrusion is known to allow improved molecular relaxation and, as such, mitigates excessive orientation in one direction and thereby allows balanced film physical properties. Increasing the stalk or expansion height generally provides higher cross direction (CD) properties and, thereby, higher average film properties. Stalk extrusion, and particularly high-stalk extrusion, is very useful for preparing blown films from high molecular weight polyethylene compositions such as, for example, high molecular high density polyethylene (HMW-HDPE) and high molecular low density polyethylene (HMW-LDPE) which possess sufficient melt strength to insure adequate bubble stability.

In pocket extrusion, air is supplied by an air ring disposed immediately adjacent to the annular die to cause the bubble leaving the die to immediately inflate and expand. The air ring is typically a dual-lip type to insure added bubble stability. Pocket extrusion is more widely employed than stalk extrusion and is generally preferred for lower molecular weight, lower melt strength polyethylene compositions such as, for example, linear low density polyethylene (LLDPE) and ultra low density polyethylene (ULDPE).

Both monolayer and multilayer films can be prepared by stalk and pocket extrusion and the films of the present invention can be monolayer or multilayer structures. Multilayer polyethylene films can be prepared by any known technique in the art, including, for example, coextrusion, lamination or combinations of both, and the like. However, the preferred medium modulus, thick polyethylene film of the present invention is a monolayer film structure.

Although the film of this invention can be prepared by variable stalk extrusion, pocket extrusion and low-stalk extrusion are preferred where the high molecular weight linear ethylene polymer, Component (A), has an $I_5$ melt index greater than about 0.5 g/10 minutes, particularly greater than about 0.6 g/10 minutes, and most particularly greater than about 0.7 g/10 minutes. High stalk extrusion, where the distance between the die and the occurrence of bubble expansion is usually from about 30 to about 42 inches (about 76 to about 107 centimeters), i.e., from about 6 to about 10 die diameters, is preferred for preparing of the film of this invention where the high molecular weight linear ethylene polymer, component (A), has an $I_5$ melt index less than or equal to about 0.5 g/10 minutes, particularly less than about 0.4 g/10 minutes, and most particularly less than about 0.3 g/10 minutes.

The Components (A) and (B) used to prepare the film of this invention can be individually blended (i.e., where a component itself is a polymer blend of two or more subcomponent polymers) or admixed together by any suitable means known in the art. Suitable means are thought to include tumble dry-blending the components together prior to charging the blown film extruder, weigh-feeding the components directly into the blown film extruder, melt-blending the components via compound or side-arm extrusion prior to introduction into the blown film extruder, multiple reactor polymerization of the components with reactors in series or in parallel and optionally with different catalyst and/or monomer types in each reactor, or the like as well as combinations thereof.

In addition to the above equations respecting the tear and impact performance of the film of this invention, temperature rising elution fractionation (TREF) can also be used to "fingerprint" or identify the novel film of this invention as well as the film compositions used to make the novel film.

Additives, such as antioxidants (e.g., hindered phenolics, such as Irganox® 1010 or Irganox® 1076 supplied by Ciba Geigy), phosphites (e.g., Irgafos® 168 also supplied by Ciba Geigy), cling additives (e.g., PIB), Standostab PEPQ™ (supplied by Sandoz), pigments, colorants, fillers, and the like can also be included in the film of the present invention, or the polymer compositions used to make the same, to the extent that such additives or ingredients do not interfere with the improved tear and impact resistance performance discovered by Applicants. Although generally not required, the film of the present invention can also contain additives to enhance antiblocking and coefficient of friction characteristics including, but not limited to, untreated and treated silicon dioxide, talc, calcium carbonate, and clay, as well as primary, secondary and substituted fatty acid amides, release agents, silicone coatings, etc. Still other additives, such as quaternary ammonium compounds alone or in combination with ethylene-acrylic acid (EAA) copolymers or other functional polymers, can also be added to enhance the antistatic characteristics of the film of this invention and allow, for example, heavy-duty packaging of electronically sensitive goods.

Advantageously, because of the improved strength properties of the novel film, recycled and scrap materials as well as diluent polymers can be incorporated or admixed into the film compositions used to make the novel film at higher loadings than is typically possible with prior art polyethylene film compositions and still provide or maintain the desired performance properties for successful use in heavy-duty packaging and shipping applications. Suitable diluent materials include, for example, elastomers, rubbers and anhydride modified polyethylenes (e.g., polybutylene and maleic anhydride grafted LLDPE and HDPE) as well as with high pressure polyethylenes such as, for example, low density polyethylene (LDPE), ethylene/acrylic acid (EAA) interpolymers, ethylene/vinyl acetate (EVA) interpolymers and ethylene/methacrylate (EMA) interpolymers, and combinations thereof and the like.

EXAMPLES

The following examples illustrate some of the particular embodiments of the present invention, but the following should not be construed to mean the invention is limited only to the particular embodiments shown.

Table 1 lists various resin types for use in investigating the requirements for improved medium modulus films.

TABLE 1

Resin Types and Properties

| Resin Type* | Melt Index g/10 min | Density g/cc | Melt Flow Ratio | Comonomer Type | Process Type |
|---|---|---|---|---|---|
| HMW-HDPE | 0.26 $I_5$ | 0.942 | 5.5 $I_{21.6}/I_{10}$ | Butene | Slurry |
| HMW-HDPE | 0.26 $I_5$ | 0.935 | 5.25 $I_{21.6}/I_{10}$ | Butene | Slurry |
| MDPE | 1.0 $I_2$ | 0.935 | 7.7 $I_{10}/I_2$ | Octene | Solution |
| ULDPE | 0.8 $I_2$ | 0.905 | 8.7 $I_{10}/I_2$ | Octene | Solution |
| ULDPE | 1.0 $I_2$ | 0.912 | 8.2 $I_{10}/I_2$ | Octene | Solution |
| ULDPE | 0.5 $I_2$ | 0.901 | 13.0 $I_{10}/I_2$ | Octene | Solution |
| ULDPE | 1.0 $I_2$ | 0.911 | 8.4 $I_{10}/I_2$ | Hexene | Gas Phase |
| ULDPE | 1.0 $I_2$ | 0.905 | 8.4 $I_{10}/I_2$ | Butene | Gas Phase |
| ULDPE | 0.5 $I_2$ | 0.902 | 14.0 $I_{10}/I_2$ | Butene | Gas Phase |

*HMW-HDPE and MDPE resins are supplied by The Dow Chemical Company. ULDPE resins are supplied by The Dow Chemical Company and Union Carbide Corporation.

Tables 2–8 summarize the various component resins and film compositions for use in studies to determine the requirements for medium modulus, thick films with improved strength properties. With the exceptions of Comparative Films prepared from Compositions B, N and O, all Inventive Films and Comparative Films comprising polymer blends as well as Comparative Films prepared from Composition G (a high molecular weight non-blended, single polymer composition) are prepared by using a seven-zone Kiefel high-stalk blown film line equipped with a 70-millimeter diameter, grooved barrel extruder, a decompression screw, a 113-millimeter diameter annular die, a 1.2 millimeter die gap and no internal bubble cooling. During these fabrications, the blow-up ratio is maintained at 3.3/1, neck height is maintained at 41 inches (104 cm) and output is maintained at 220 lb/hr (100 kg/hr) for thicknesses greater than 0.5 mils and at 170 lb/hr (77 kg/hr) for thicknesses less than or equal to 0.5 mil to provide 23-inch (58.4-cm) layflat film.

Comparative Films prepared from Compositions B, N and O (medium molecular weight non-blended, single polymer compositions) utilize a pocket blown film line equipped with a 64-millimeter diameter 24:1 L/D extruder, a barrier screw, a 15.2-cm diameter annular die and a 70-mil die gap. The blow-up ratio is maintained at 2.5/1 and output is maintained at 141 lb/hr or 7.5 lb/hr/in of die circumference (64 kg/hr or 8.7 kg/hr/cm of die circumference). With the exception of Comparative Films prepared from Composition B, which is prepared with an incline extruder profile, all film preparations employ a reverse temperature profile. The melt temperature of all film preparations is maintained at 415°–430° F. (213°–221° C.) The physical properties of the resultant Inventive Films and Comparative Films from Compositions A–O as a function of thickness are also summarized in Table 2–8.

The Tables report calculated film density. Like calculated film density determinations, the composition $I_5$ values reported in the Tables are also derived from weight-fraction calculations. For purposes of this invention and for component polymers, all reported $I_2$ values less than 0.5 g/10 minutes and $I_5$ values greater than 1.0 g/10 minutes are calculated values based on the following relationship:

$$1.0\ I_2 = 5.1\ I_5.$$

Additionally, for component polymers, reported $I_{21.6}/I_{10}$ values less than 4.0 and $I_{10}/I_2$ values greater than 15 are also calculated values based on the following relationship:

$$4.4\ I_{10}/I_2 = 1.0\ I_{21.6}/I_{10}.$$

For purposes of this invention and as an example, the following computation is the weight-fraction calculation for determining the calculated film density of Inventive Example 1 which comprises 80 weight percent of a HDPE having a density of 0.942 g/cc and 20 weight percent of an ULDPE having a density of 0.905 g/cc:

calculated film density (in g/cc)=(0.8)(0.942 g/cc)+(0.2)(0.905 g/cc)=0.935 g/cc.

The following computation example is the weight-fraction calculation for determining the calculated composition $I_5$ of Inventive Example 1 which comprises 80 weight percent of a HDPE having an $I_5$ of 0.75 g/10 minutes and 20 weight percent of an ULDPE having an $I_2$ of 1.0 g/10 minutes:

calculated composition $I_5$ (in g/10 min.)=(0.8)(0.26 $I_5$)+(0.2) (1.0 $I_2$)(5.1 $I_5$/1.0 $I_2$)=0.71 $I_5$.

The following computation example is the factor-based calculation for determining the $I_5$ melt index of the ULDPE having a 0.8 g/10 minutes $I_2$ that used to prepared Composition A:

calculated component polymer $I_5$ (in g/10 min.)=(0.8 $I_2$)(5.1 $I_5$/1.0 $I_2$)=4.08 $I_5$.

The following computation example is the factor-based calculation for determining the $I_{21.6}/I_{10}$ ratio of the ULDPE having a 8.7 $I_{10}/I_2$ ratio that used to prepared Composition A:

calculated component polymer $I_{21.6}/I_{10}$=(8.7 $I_{10}/I_2$)(1.0 $I_{21.6}/I_{10}$+4.4 $I_{10}/I_2$)=1.98 $I_{21.6}/I_{10}$.

The following computation example is the normalization calculation for determining the tear strength of Inventive Example 1 at 2 mils where the tear strength is 516 grams at 2.12 mils:

tear strength at 2 mils (in grams)=(516 g)(2.0 mils/2.12 mils)=487 grams.

TABLE 2

Film Compositions and Film Physical Properties

| | Composition A | | | | Composition B | | | |
|---|---|---|---|---|---|---|---|---|
| EXAMPLE | 1 | 2* | 3 | 4 | 5* | 6* | 7* | 8* |
| COMPONENT (A) | | | | | | | | |
| Type | HDPE | HDPE | HDPE | HDPE | MLDPE | MLDPE | MLDPE | MLDPE |
| Polymerization Process | Slurry | Slurry | Slurry | Slurry | Solution | Solution | Solution | Solution |
| Comonomer | Butene | Butene | Butene | Butene | Octene | Octene | Octene | Octene |

TABLE 2-continued

Film Compositions and Film Physical Properties

| | Composition A | | | | Composition B | | | |
|---|---|---|---|---|---|---|---|---|
| EXAMPLE | 1 | 2* | 3 | 4 | 5* | 6* | 7* | 8* |
| $I_5$, g/10 min. | 0.26 | 0.26 | 0.26 | 0.26 | 5.1 | 5.1 | 5.1 | 5.1 |
| $I_2$, g/10 min. | 0.05 | 0.05 | 0.05 | 0.05 | 1.0 | 1.0 | 1.0 | 1.0 |
| Density, g/cc | 0.942 | 0.942 | 0.942 | 0.942 | 0.935 | 0.935 | 0.935 | 0.935 |
| $I_{21.6}/I_{10}$ | 5.5 | 5.5 | 5.5 | 5.5 | 1.5 | 1.5 | 1.5 | 1.5 |
| $I_{10}/I_2$ | 24.2 | 24.2 | 24.2 | 24.2 | 7.7 | 7.7 | 7.7 | 7.7 |
| COMPONENT (B) | | | | | | | | |
| Type | ULDPE | ULDPE | ULDPE | ULDPE | None | None | None | None |
| Polymerization Process | Solution | Solution | Solution | Solution | — | — | — | — |
| Comonomer | Octene | Octene | Octene | Octene | — | — | — | — |
| $I_5$, g/10 min. | 4.1 | 4.1 | 4.1 | 4.1 | — | — | — | — |
| $I_2$, g/10 min. | 0.8 | 0.8 | 0.8 | 0.8 | — | — | — | — |
| Density, g/cc | 0.905 | 0.905 | 0.905 | 0.905 | — | — | — | — |
| $I_{21.6}/I_{10}$ | 2.0 | 2.0 | 2.0 | 2.0 | — | — | — | — |
| $I_{10}/I_2$ | 8.7 | 8.7 | 8.7 | 8.7 | — | — | — | — |
| (A)/(B) BLEND WT. % | 80/20 | 80/20 | 80/20 | 80/20 | 100/0 | 100/0 | 100/0 | 100/0 |
| PHYSICAL PROPERTIES | | | | | | | | |
| Film Thickness, mils | 2.12 | 0.84 | 3.55 | 5.75 | 0.62 | 2.86 | 3.48 | 8.22 |
| Cal. Film Density, g/cc | 0.935 | 0.935 | 0.935 | 0.935 | 0.935 | 0.935 | 0.935 | 0.935 |
| Composition $I_5$, g/10 min. | 0.71 | 0.71 | 0.71 | 0.71 | 5.1 | 5.1 | 5.1 | 5.1 |
| CD Tear, grams | 743 | 147 | 1265 | 1525 | 323 | 441 | 556 | 1359 |
| MD Tear, grams | 288 | 27 | 645 | 1207 | 31 | 305 | 333 | 1027 |
| Tear Strength, grams | 516 | 87 | 955 | 1366 | 177 | 373 | 445 | 1193 |

*Denotes Comparative Examples only; i.e., the examples are not examples of the present invention.
Cal. Film Density denotes calculated film density.

TABLE 3

Film Compositions and Film Physical Properties

| | Composition C | | | | Composition D | | | |
|---|---|---|---|---|---|---|---|---|
| EXAMPLE | 9 | 10* | 11* | 12* | 13* | 14* | 15* | 16* |
| COMPONENT (A) | | | | | | | | |
| Type | MDPE | MDPE | MDPE | MDPE | HDPE | HDPE | HDPE | HDPE |
| Polymerization Process | Slurry | Slurry | Slurry | Slurry | Slurry | Slurry | Slurry | Slurry |
| Comonomer | Butene | Butene | Butene | Butene | Butene | Butene | Butene | Butene |
| $I_5$, g/10 min. | 0.26 | 0.26 | 0.26 | 0.26 | 0.26 | 0.26 | 0.26 | 0.26 |
| $I_2$, g/10 min. | 0.05 | 0.05 | 0.05 | 0.05 | 0.05 | 0.05 | 0.05 | 0.05 |
| Density, g/cc | 0.935 | 0.935 | 0.935 | 0.935 | 0.942 | 0.942 | 0.942 | 0.942 |
| $I_{21.6}/I_{10}$ | 5.25 | 5.25 | 5.25 | 5.25 | 5.5 | 5.5 | 5.5 | 5.5 |
| $I_{10}/I_2$ | 23.1 | 23.1 | 23.1 | 23.1 | 24.2 | 24.2 | 24.2 | 24.2 |
| COMPONENT (B) | | | | | | | | |
| Type | None | None | None | None | ULDPE | ULDPE | ULDPE | ULDPE |
| Polymerization Process | — | — | — | — | Gas Phase | Gas Phase | Gas Phase | Gas Phase |
| Comonomer | — | — | — | — | Hexene | Hexene | Hexene | Hexene |
| $I_5$, g/10 min. | — | — | — | — | 5.1 | 5.1 | 5.1 | 5.1 |
| $I_2$, g/10 min. | — | — | — | — | 1.0 | 1.0 | 1.0 | 1.0 |
| Density, g/cc | — | — | — | — | 0.911 | 0.911 | 0.911 | 0.911 |
| $I_{21.6}/I_{10}$ | — | — | — | — | 1.9 | 1.9 | 1.9 | 1.9 |
| $I_{10}/I_2$ | — | — | — | — | 8.4 | 8.4 | 8.4 | 8.4 |
| (A)/(B) BLEND WT. % | 100/0 | 100/0 | 100/0 | 100/0 | 80/20 | 80/20 | 80/20 | 80/20 |
| PHYSICAL PROPERTIES | | | | | | | | |
| Film Thickness, mils | 0.55 | 2.88 | 5.1 | 6.17 | 0.54 | 2.89 | 4.78 | 7.97 |
| Cal. Film Density, g/cc | 0.935 | 0.935 | 0.935 | 0.935 | 0.936 | 0.936 | 0.936 | 0.936 |
| Composition $I_5$, g/10 min. | 0.26 | 0.26 | 0.26 | 0.26 | 0.72 | 0.72 | 0.72 | 0.72 |
| CD Tear, grams | 95 | 573 | 828 | 1100 | 43 | 292 | 747 | 1443 |
| MD Tear, grams | 9 | 306 | 726 | 969 | 8 | 314 | 750 | ≧1600 |
| Tear Strength, grams | 52 | 440 | 777 | 1035 | 26 | 303 | 749 | 1522 |

*Denotes Comparative Examples only; i.e., the examples are not examples of the present invention.
Cal. Film Density denotes calculated film density.

TABLE 4

Film Compositions and Film Physical Properties

| | Composition E | | | | Composition F | | | |
|---|---|---|---|---|---|---|---|---|
| EXAMPLE | 17* | 18* | 19* | 20* | 21* | 22* | 23* | 24* |
| COMPONENT (A) | | | | | | | | |
| Type | HDPE | HDPE | HDPE | HDPE | HDPE | HDPE | HDPE | HDPE |
| Polymerization Process | Slurry | Slurry | Slurry | Slurry | Slurry | Slurry | Slurry | Slurry |
| Comonomer | Butene | Butene | Butene | Butene | Butene | Butene | Butene | Butene |
| $I_5$, g/10 min. | 0.26 | 0.26 | 0.26 | 0.26 | 0.26 | 0.26 | 0.26 | 0.26 |
| $I_2$, g/10 min. | 0.05 | 0.05 | 0.05 | 0.05 | 0.05 | 0.05 | 0.05 | 0.05 |
| Density, g/cc | 0.942 | 0.942 | 0.942 | 0.942 | 0.942 | 0.942 | 0.942 | 0.942 |
| $I_{21.6}/I_{10}$ | 5.5 | 5.5 | 5.5 | 5.5 | 5.5 | 5.5 | 5.5 | 5.5 |
| $I_{10}/I_2$ | 24.2 | 24.2 | 24.2 | 24.2 | 24.2 | 24.2 | 24.2 | 24.2 |
| COMPONENT (B) | | | | | | | | |
| Type | ULDPE | ULDPE | ULDPE | ULDPE | ULDPE | ULDPE | ULDPE | ULDPE |
| Polymerization Process | Gas Phase | Gas Phase | Gas Phase | Gas Phase | Gas Phase | Gas Phase | Gas Phase | Gas Phase |
| Comonomer | Butene | Butene | Butene | Butene | Butene | Butene | Butene | Butene |
| $I_5$, g/10 min. | 5.1 | 5.1 | 5.1 | 5.1 | 2.6 | 2.6 | 2.6 | 2.6 |
| $I_2$, g/10 min. | 1.0 | 1.0 | 1.0 | 1.0 | 0.5 | 0.5 | 0.5 | 0.5 |
| Density, g/cc | 0.905 | 0.905 | 0.905 | 0.905 | 0.902 | 0.902 | 0.902 | 0.902 |
| $I_{21.6}/I_{10}$ | 1.9 | 1.9 | 1.9 | 1.9 | 3.2 | 3.2 | 3.2 | 3.2 |
| $I_{10}/I_2$ | 8.4 | 8.4 | 8.4 | 8.4 | 14.0 | 14.0 | 14.0 | 14.0 |
| (A)/(B) BLEND WT. % | 80/20 | 80/20 | 80/20 | 80/20 | 80/20 | 80/20 | 80/20 | 80/20 |
| PHYSICAL PROPERTIES | | | | | | | | |
| Film Thickness, mils | 0.52 | 2.87 | 4.69 | 7.41 | 0.61 | 2.99 | 4.74 | 7.37 |
| Cal. Film Density, g/cc | 0.935 | 0.935 | 0.935 | 0.935 | 0.934 | 0.934 | 0.934 | 0.934 |
| Composition $I_5$, g/10 min. | 0.72 | 0.72 | 0.72 | 0.72 | 0.68 | 0.68 | 0.68 | 0.68 |
| CD Tear, grams | 52 | 399 | 680 | 1046 | 43 | 384 | 544 | 1168 |
| MD Tear, grams | 8 | 330 | 752 | 1284 | 8 | 338 | 645 | 1397 |
| Tear Strength, grams | 30 | 365 | 716 | 1165 | 26 | 361 | 595 | 1283 |

*Denotes Comparative Examples only; i.e., the examples are not examples of the present invention.
Cal. Film Density denotes calculated film density.

TABLE 5

Film Compositions and Film Physical Properties

| | Composition H | | | | Composition G | | | |
|---|---|---|---|---|---|---|---|---|
| EXAMPLE | 25* | 26 | 27 | 28 | 29* | 30* | 31* | 32* |
| COMPONENT (A) | | | | | | | | |
| Type | HDPE | HDPE | HDPE | HDPE | HDPE | HDPE | HDPE | HDPE |
| Polymerization Process | Slurry | Slurry | Slurry | Slurry | Slurry | Slurry | Slurry | Slurry |
| Comonomer | Butene | Butene | Butene | Butene | Butene | Butene | Butene | Butene |
| $I_5$, g/10 min. | 0.30 | 0.30 | 0.30 | 0.30 | 0.26 | 0.26 | 0.26 | 0.26 |
| $I_2$, g/10 min. | 0.06 | 0.06 | 0.06 | 0.06 | 0.05 | 0.05 | 0.05 | 0.05 |
| Density, g/cc | 0.950 | 0.950 | 0.950 | 0.950 | 0.942 | 0.942 | 0.942 | 0.942 |
| $I_{21.6}/I_{10}$ | 5.45 | 5.45 | 5.45 | 5.45 | 5.5 | 5.5 | 5.5 | 5.5 |
| $I_{10}/I_2$ | 24.0 | 24.0 | 24.0 | 24.0 | 24.2 | 24.2 | 24.2 | 24.2 |
| COMPONENT (B) | | | | | | | | |
| Type | ULDPE | ULDPE | ULDPE | ULDPE | None | None | None | None |
| Polymerization Process | Solution | Solution | Solution | Solution | — | — | — | — |
| Comonomer | Octene | Octene | Octene | Octene | — | — | — | — |
| $I_5$, g/10 min. | 4.1 | 4.1 | 4.1 | 4.1 | — | — | — | — |
| $I_2$, g/10 min. | 0.8 | 0.8 | 0.8 | 0.8 | — | — | — | — |
| Density, g/cc | 0.905 | 0.905 | 0.905 | 0.905 | — | — | — | — |
| $I_{21.6}/I_{10}$ | 2.0 | 2.0 | 2.0 | 2.0 | — | — | — | — |
| $I_{10}/I_2$ | 8.7 | 8.7 | 8.7 | 8.7 | — | — | — | — |
| (A)/(B) BLEND WT. % | 80/20 | 80/20 | 80/20 | 80/20 | 100/0 | 100/0 | 100/0 | 100/0 |
| PHYSICAL PROPERTIES | | | | | | | | |
| Film Thickness, mils | 0.66 | 2.74 | 4.73 | 7.32 | 0.86 | 2.78 | 4.79 | 8.28 |
| Cal. Film Density, g/cc | 0.942 | 0.942 | 0.942 | 0.942 | 0.942 | 0.942 | 0.942 | 0.942 |
| Composition $I_5$, g/10 min. | 0.74 | 0.74 | 0.74 | 0.74 | 0.26 | 0.26 | 0.26 | 0.26 |
| CD Tear, grams | 109 | 722 | 825 | ≧1600 | 89 | 263 | 454 | 931 |

TABLE 5-continued

Film Compositions and Film Physical Properties

| | Composition H | | | | Composition G | | | |
|---|---|---|---|---|---|---|---|---|
| EXAMPLE | 25* | 26 | 27 | 28 | 29* | 30* | 31* | 32* |
| MD Tear, grams | 12 | 240 | 630 | 1440 | 28 | 224 | 514 | 1054 |
| Tear Strength, grams | 61 | 481 | 728 | 1520 | 59 | 244 | 484 | 993 |

*Denotes Comparative Examples only; i.e., the examples are not examples of the present invention.
Cal. Film Density denotes calculated film density.

TABLE 6

Film Compositions and Film Physical Properties

| | Composition I | | | | Composition J | | | |
|---|---|---|---|---|---|---|---|---|
| EXAMPLE | 33* | 34 | 35 | 36 | 37* | 38 | 39 | 40 |
| COMPONENT (A) | | | | | | | | |
| Type | HDPE | HDPE | HDPE | HDPE | HDPE | HDPE | HDPE | HDPE |
| Polymerization Process | Slurry | Slurry | Slurry | Slurry | Slurry | Slurry | Slurry | Slurry |
| Comonomer | Butene | Butene | Butene | Butene | Butene | Butene | Butene | Butene |
| $I_5$, g/10 min. | 0.26 | 0.26 | 0.26 | 0.26 | 0.26 | 0.26 | 0.26 | 0.26 |
| $I_2$, g/10 min. | 0.05 | 0.05 | 0.05 | 0.05 | 0.05 | 0.05 | 0.05 | 0.05 |
| Density, g/cc | 0.935 | 0.935 | 0.935 | 0.935 | 0.942 | 0.942 | 0.942 | 0.942 |
| $I_{21.6}/I_{10}$ | 5.25 | 5.25 | 5.25 | 5.25 | 5.5 | 5.5 | 5.5 | 5.5 |
| $I_{10}I_2$ | 23.1 | 23.1 | 23.1 | 23.1 | 24.2 | 24.2 | 24.2 | 24.2 |
| COMPONENT (B) | | | | | | | | |
| Type | ULDPE | ULDPE | ULDPE | ULDPE | ULDPE | ULDPE | ULDPE | ULDPE |
| Polymerization Process | Solution | Solution | Solution | Solution | Solution | Solution | Solution | Solution |
| Comonomer | Octene | Octene | Octene | Octene | Octene | Octene | Octene | Octene |
| $I_5$, g/10 min. | 4.1 | 4.1 | 4.1 | 4.1 | 5.1 | 5.1 | 5.1 | 5.1 |
| $I_2$, g/10 min. | 0.8 | 0.8 | 0.8 | 0.8 | 1.0 | 1.0 | 1.0 | 1.0 |
| Density, g/cc | 0.905 | 0.905 | 0.905 | 0.905 | 0.912 | 0.912 | 0.912 | 0.912 |
| $I_{21.6}/I_{10}$ | 2.0 | 2.0 | 2.0 | 2.0 | 1.9 | 1.9 | 1.9 | 1.9 |
| $I_{10}I_2$ | 8.7 | 8.7 | 8.7 | 8.7 | 8.2 | 8.2 | 8.2 | 8.2 |
| (A)/(B) BLEND WT. % | 80/20 | 80/20 | 80/20 | 80/20 | 80/20 | 80/20 | 80/20 | 80/20 |
| PHYSICAL PROPERTIES | | | | | | | | |
| Film Thickness, mils | 0.60 | 2.99 | 4.97 | 7.81 | 0.54 | 2.93 | 4.97 | 8.01 |
| Cal. Film Density, g/cc | 0.930 | 0.930 | 0.930 | 0.930 | 0.936 | 0.936 | 0.936 | 0.936 |
| Composition $I_5$, g/10 min. | 0.71 | 0.71 | 0.71 | 0.71 | 0.72 | 0.72 | 0.72 | 0.72 |
| CD Tear, grams | 124 | 719 | 1490 | ≧1600 | 149 | 920 | 1313 | ≧1600 |
| MD Tear, grams | 11 | 660 | 1336 | ≧1600 | 8 | 520 | 969 | ≧1600 |
| Tear Strength, grams | 68 | 690 | 1413 | ≧1600 | 79 | 720 | 1141 | ≧1600 |

*Denotes Comparative Examples only; i.e., the examples are not examples of the present invention.
Cal. Film Density denotes calculated film density.

TABLE 7

Film Compositions and Film Physical Properties

| | Composition K | | | | Composition L | | | |
|---|---|---|---|---|---|---|---|---|
| EXAMPLE | 41* | 42 | 43 | 44 | 45* | 46 | 47 | 48 |
| COMPONENT (A) | | | | | | | | |
| Type | HDPE | HDPE | HDPE | HDPE | HDPE | HDPE | HDPE | HDPE |
| Polymerization Process | Slurry | Slurry | Slurry | Slurry | Slurry | Slurry | Slurry | Slurry |
| Comonomer | Butene | Butene | Butene | Butene | Butene | Butene | Butene | Butene |
| $I_5$, g/10 min. | 0.26 | 0.26 | 0.26 | 0.26 | 0.26 | 0.26 | 0.26 | 0.26 |
| $I_2$, g/10 min. | 0.05 | 0.05 | 0.05 | 0.05 | 0.05 | 0.05 | 0.05 | 0.05 |
| Density, g/cc | 0.942 | 0.942 | 0.942 | 0.942 | 0.942 | 0.942 | 0.942 | 0.942 |
| $I_{21.6}/I_{10}$ | 5.5 | 5.5 | 5.5 | 5.5 | 5.5 | 5.5 | 5.5 | 5.5 |
| $I_{10}I_2$ | 24.2 | 24.2 | 24.2 | 24.2 | 24.2 | 24.2 | 24.2 | 24.2 |
| COMPONENT (B) | | | | | | | | |
| Type | ULDPE | ULDPE | ULDPE | ULDPE | ULDPE | ULDPE | ULDPE | ULDPE |
| Polymerization Process | Solution | Solution | Solution | Solution | Solution | Solution | Solution | Solution |
| Comonomer | Octene | Octene | Octene | Octene | Octene | Octene | Octene | Octene |

TABLE 7-continued

Film Compositions and Film Physical Properties

| | Composition K | | | | Composition L | | | |
|---|---|---|---|---|---|---|---|---|
| EXAMPLE | 41* | 42 | 43 | 44 | 45* | 46 | 47 | 48 |
| $I_5$, g/10 min. | 2.6 | 2.6 | 2.6 | 2.6 | 4.1 | 4.1 | 4.1 | 4.1 |
| $I_2$, g/10 min. | 0.5 | 0.5 | 0.5 | 0.5 | 0.8 | 0.8 | 0.8 | 0.8 |
| Density, g/cc | 0.901 | 0.901 | 0.901 | 0.901 | 0.905 | 0.905 | 0.905 | 0.905 |
| $I_{21.6}/I_{10}$ | 3.0 | 3.0 | 3.0 | 3.0 | 2.0 | 2.0 | 2.0 | 2.0 |
| $I_{10}I_2$ | 13.0 | 13.0 | 13.0 | 13.0 | 8.7 | 8.7 | 8.7 | 8.7 |
| (A)/(B) BLEND WT. % | 80/20 | 80/20 | 80/20 | 80/20 | 85/15 | 85/15 | 85/15 | 85/15 |
| PHYSICAL PROPERTIES | | | | | | | | |
| Film Thickness, mils | 0.60 | 2.25 | 3.49 | 5.97 | 0.86 | 2.40 | 4.83 | 5.83 |
| Cal. Film Density, g/cc | 0.933 | 0.933 | 0.933 | 0.933 | 0.937 | 0.937 | 0.937 | 0.937 |
| Composition $I_5$, g/10 min. | 0.68 | 0.68 | 0.68 | 0.68 | 0.67 | 0.67 | 0.67 | 0.67 |
| CD Tear, grams | 106 | 777 | 1128 | 1315 | 150 | 757 | 786 | 1376 |
| MD Tear, grams | 11 | 195 | 375 | 998 | 31 | 315 | 620 | 1197 |
| Tear Strength, grams | 59 | 486 | 752 | 1157 | 91 | 536 | 703 | 1287 |

*Denotes Comparative Examples only; i.e., the examples are not examples of the present invention.
Cal. Film Density denotes calculated film density.

TABLE 8

Film Compositions and Film Physical Properties

| | Composition M | | | | Composition N | Composition O |
|---|---|---|---|---|---|---|
| EXAMPLE | 49* | 50 | 51 | 52 | 53* | 54* |
| COMPONENT (A) | | | | | | |
| Type | HDPE | HDPE | HDPE | HDPE | None | None |
| Polymerization Process | Slurry | Slurry | Slurry | Slurry | — | — |
| Comonomer | Butene | Butene | Butene | Butene | — | — |
| $I_5$, g/10 min. | 0.26 | 0.26 | 0.26 | 0.26 | — | — |
| $I_2$, g/10 min. | 0.05 | 0.05 | 0.05 | 0.05 | — | — |
| Density, g/cc | 0.942 | 0.942 | 0.942 | 0.942 | — | — |
| $I_{21.6}/I_{10}$ | 5.5 | 5.5 | 5.5 | 5.5 | — | — |
| $I_{10}I_2$ | 24.2 | 24.2 | 24.2 | 24.2 | — | — |
| COMPONENT (B) | | | | | | |
| Type | ULDPE | ULDPE | ULDPE | ULDPE | ULDPE | ULDPE |
| Polymerization Process | Solution | Solution | Solution | Solution | Solution | Solution |
| Comonomer | Octene | Octene | Octene | Octene | Octene | Octene |
| $I_5$, g/10 min. | 4.1 | 4.1 | 4.1 | 4.1 | 4.1 | 5.1 |
| $I_2$, g/10 min. | 0.8 | 0.8 | 0.8 | 0.8 | 0.8 | 1.0 |
| Density, g/cc | 0.905 | 0.905 | 0.905 | 0.905 | 0.905 | 0.912 |
| $I_{21.6}/I_{10}$ | 2.0 | 2.0 | 2.0 | 2.0 | 2.0 | 1.9 |
| $I_{10}I_2$ | 8.7 | 8.7 | 8.7 | 8.7 | 8.7 | 8.2 |
| (A)/(B) BLEND WT. % | 70/30 | 70/30 | 70/30 | 70/30 | 1/100 | 1/100 |
| PHYSICAL PROPERTIES | | | | | | |
| Film Thickness, mils | 0.69 | 3.14 | 5.06 | 7.84 | 2.0 | 2.0 |
| Cal. Film Density, g/cc | 0.931 | 0.931 | 0.931 | 0.931 | 0.905 | 0.912 |
| Composition $I_5$, g/10 min. | 0.80 | 0.80 | 0.80 | 0.80 | 4.1 | 5.1 |
| CD Tear, grams | 127 | 1414 | ≧1600 | ≧1600 | 1178 | 1550 |
| MD Tear, grams | 17 | 759 | ≧1600 | ≧1600 | 1427 | 1390 |
| Tear Strength, grams | 72 | 1087 | ≧1600 | ≧1600 | 1302 | 1470 |

*Denotes Comparative Examples only; i.e., the examples are not examples of the present invention.
Cal. Film Density denotes calculated film density.

Figure 2:
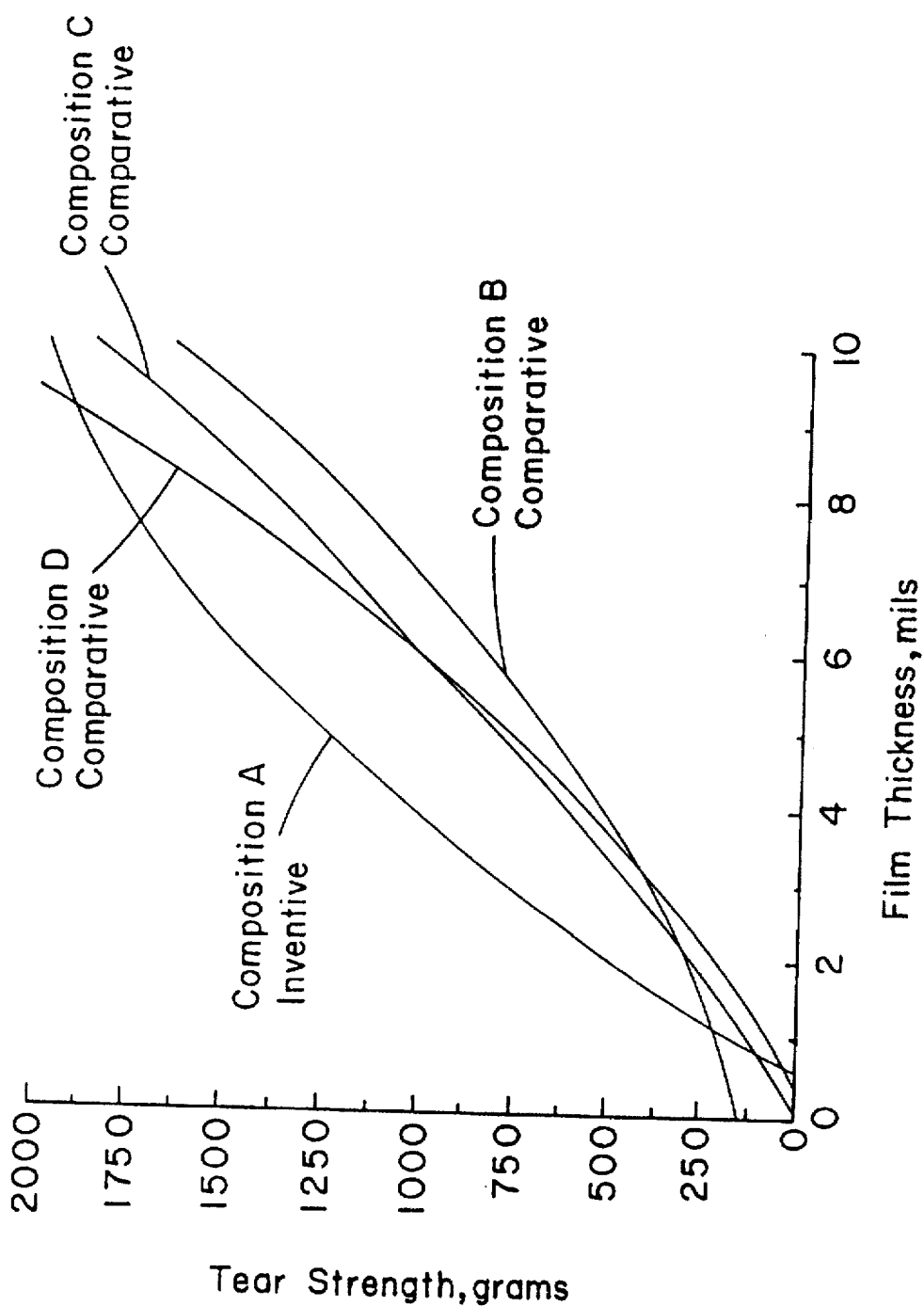

The physical property data in Tables 2–8 and FIGS. 2–7 demonstrate that films prepared in accordance with the present invention exhibit substantially improved tear strengths in comparisons with other films prepared with and without blending that have the same film density and film thickness and similar melt index. FIG. 2 specifically illustrates that Inventive Films prepared from Composition A exhibit superior tear strength at film thickness greater than 1.25 mils (31 microns), particularly in the range of 1.5 to about 8.75 mils, and especially in the range of 2 mils to about 8 mils in comparison to Comparative Films prepared from Compositions B, C and D at equivalent densities.

Figure 3:
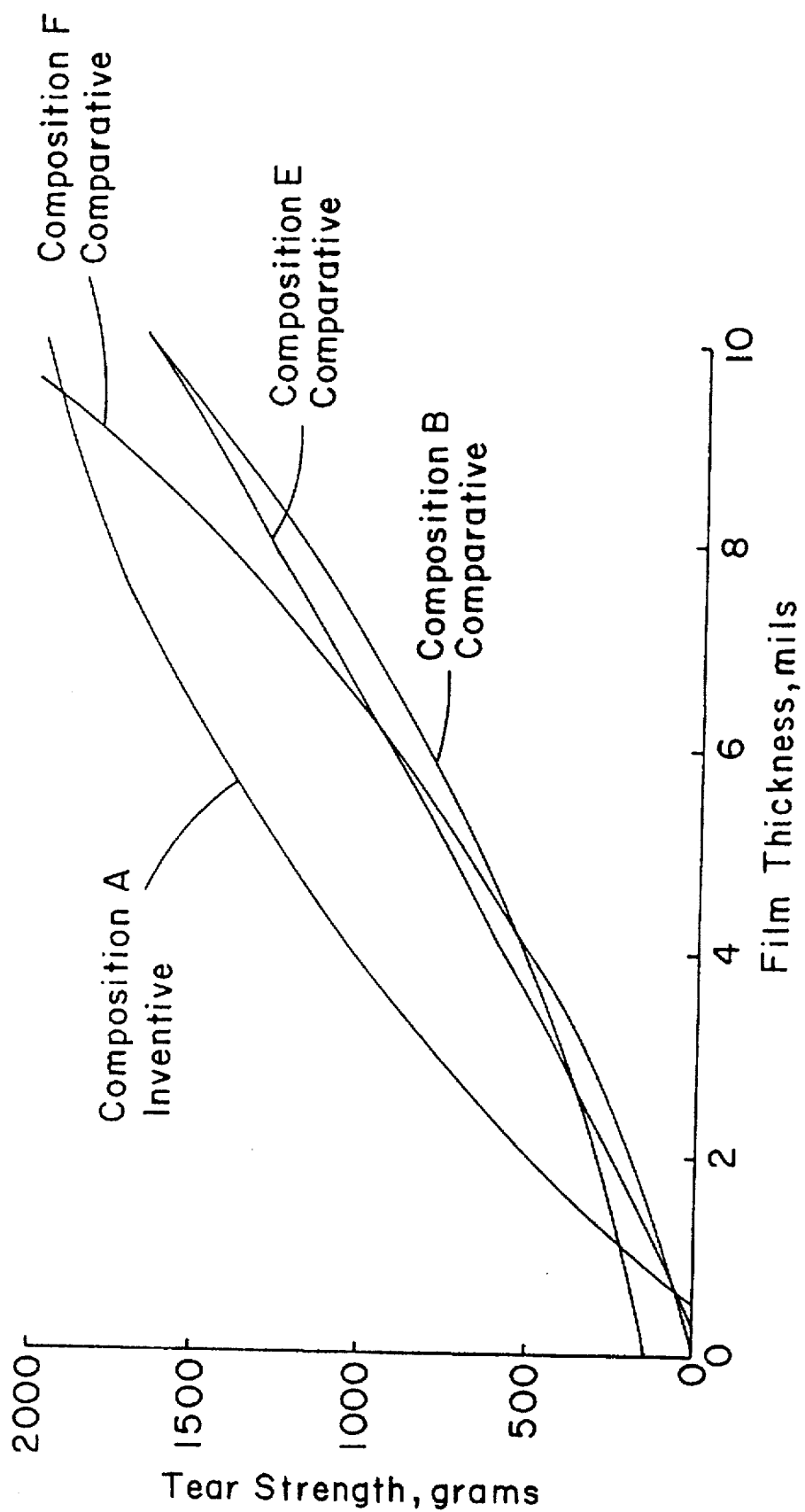

FIGS. 2 and 3 show that the solution process and/or 1-octene is preferred over the gas phase process and/or 1-butene and 1-hexene for producing a suitable lower density ethylene/α-olefin interpolymer, Component B, for admixing with a suitable high molecular weight linear ethylene interpolymer, Component A, to prepare the novel film of the present invention. The figures show that in an 80/20 by weight blend combination with a suitable Component A, a lower density ethylene/octene copolymer produced by a solution process (Inventive Films prepared from Composition A, i.e., Inventive Examples 1,3 and 4) yields significantly better tear strengths in the range of about 1.5 mils to about 8.5 mils than Comparative Films based on with a lower density ethylene/α-olefin interpolymer produced by a gas process with either 1-butene or 1-hexene as the comonomer (Comparative Films prepared from Compositions D, E and F, i.e., Comparative Examples 13–24). In direct comparisons at about 6 mils, Inventive Films prepared from Composition A exhibit as high as about 60 percent higher tear strength than Comparative Films based on gas phase-produced interpolymers. However, Applicants believe this differential is not due to process type per se, but reflects a higher α-olefin requirement when a gas phase process is utilized to produce a suitable Component B.

Figure 4:
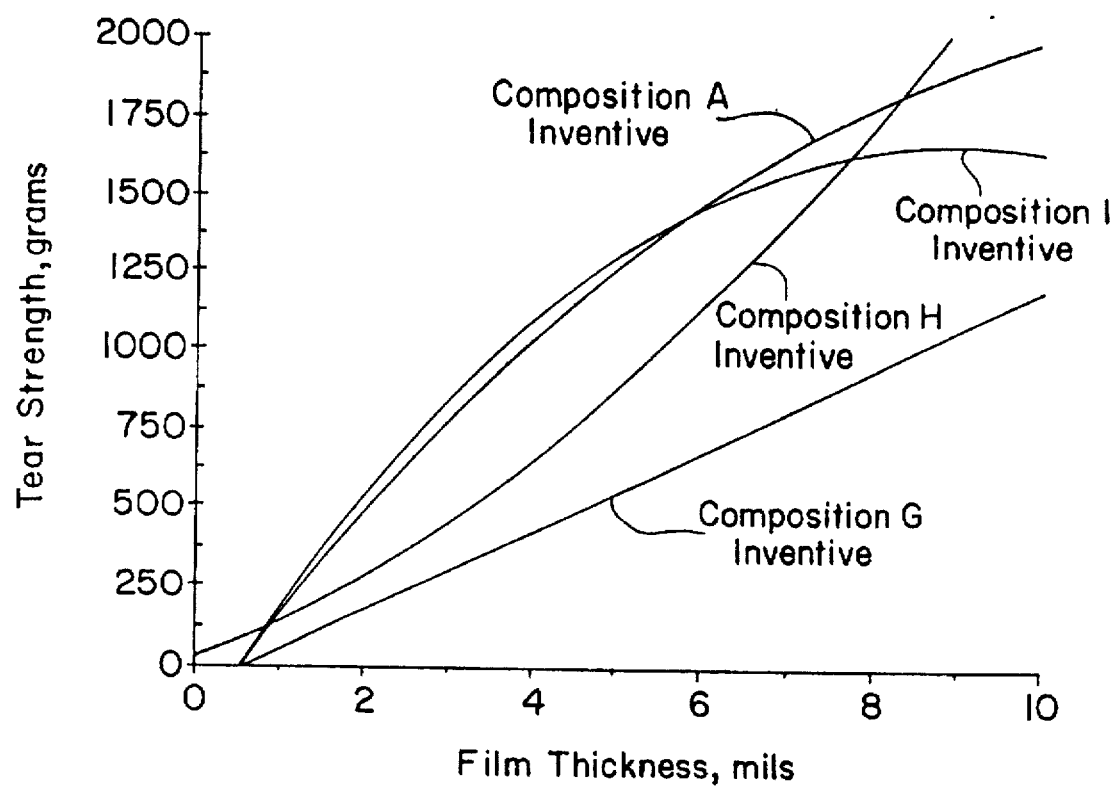

FIG. 4 shows Inventive Films prepared from Compositions A, H and I are significantly and unobviously superior to Comparative Films prepared from Composition G, a high molecular linear ethylene interpolymer having a density about 0.942 g/cc and an $I_5$ about 0.26. The superior performance of Inventive Films prepared from Composition H (Inventive Examples 26–28) is particularly unobvious since their film densities are equivalent to the film densities of Comparative Films prepared from Composition G (Comparative 29–32). The superior performance of Inventive Films prepared from Compositions H and I demonstrate that Component A can have a density in the range of about 0.935 g/cc to about 0.95 g/cc, although not necessarily limited thereto.

Figure 5:
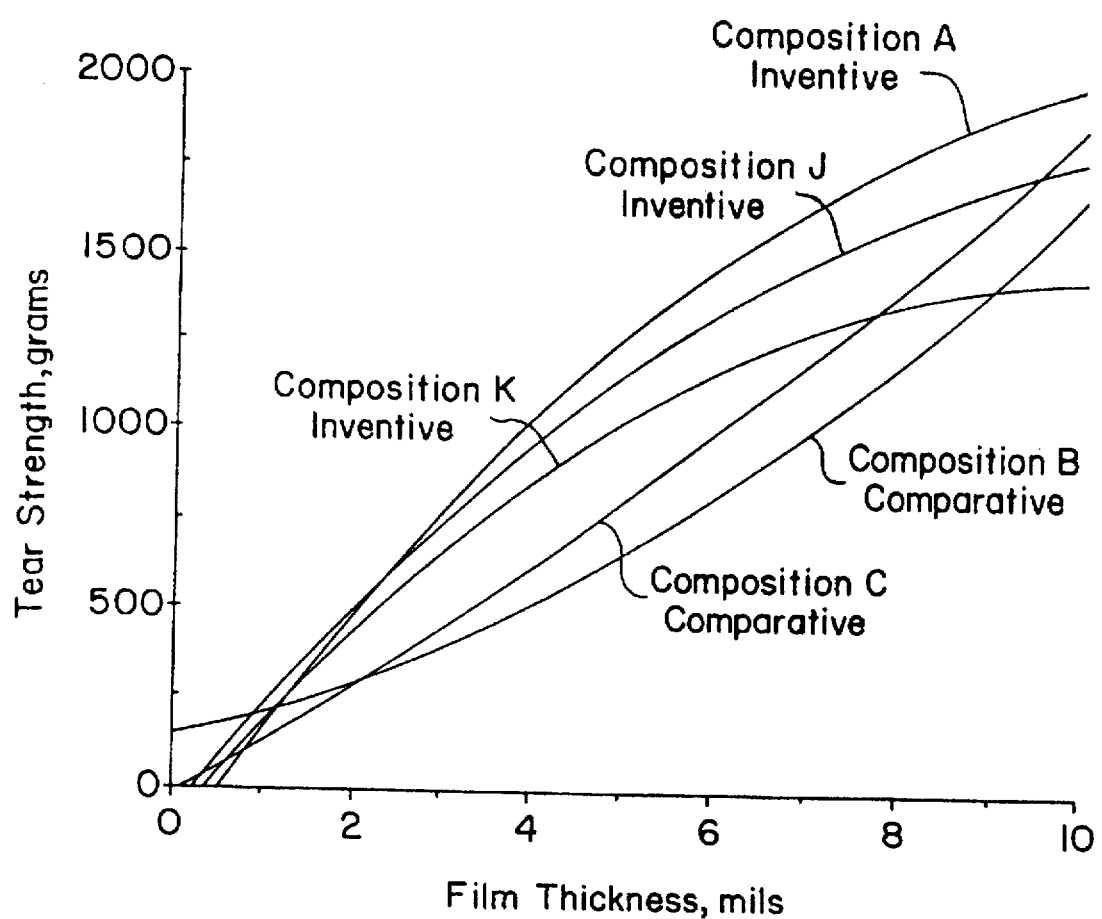
Figure 6:
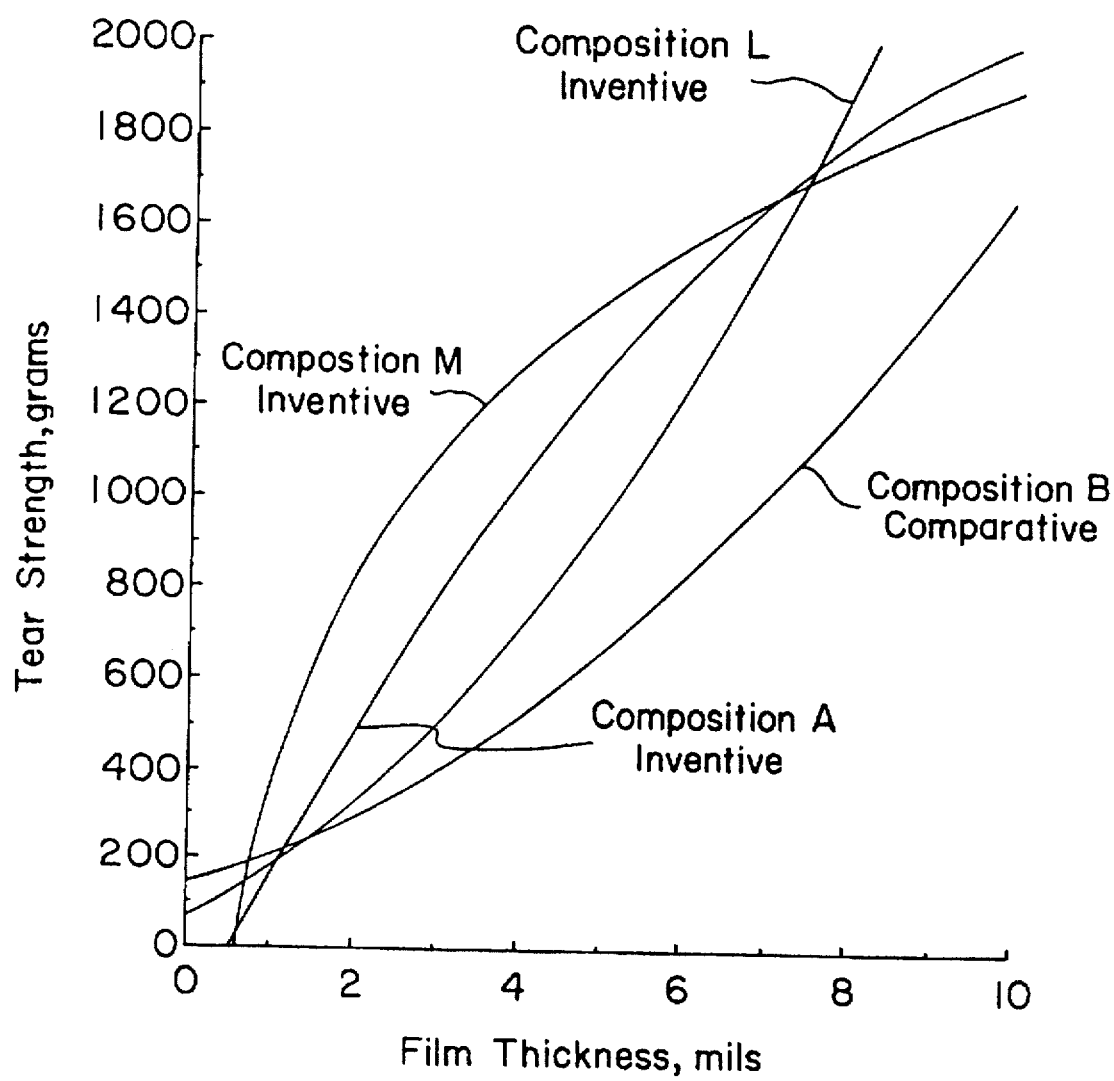

FIG. 5 illustrates the superior tear performance of Inventive Films prepared from Compositions A, J and K in comparison to Comparative Films prepared from Compositions B and C. FIG. 6 also shows that Component B can have a density in range of about 0.901 g/cc to about 0.912 g/cc and an $I_2$ melt in range of about 0.8 g/10 minutes and 1.0 g/10 minutes, although each are not necessarily limited thereto.

FIG. 6 shows the novel performance of Inventive Films prepared from Compositions A, L and M. FIG. 6 also shows that the superior performance of the novel film of the present invention can be obtained with blend combinations of Components A and B at 70%/30%, 80%/20% and 85%/15% by weight, respectively.

FIG. 7 shows the relationship between film thickness and tear strength for the Inventive Films prepared from Compositions A, H, I, J, K, L and M and for the Comparative Films prepared from Compositions B, C, D, E, F and G. FIG. 7 also shows the respective equations resulting from regression analysis for each composition. A comparison of the equations pertaining to the Inventive Films and the Comparative Films indicates the tear strength of the novel film of the present invention corresponds to the following expression:

tear strength(grams)=$Ax+Bx^2+C$ where A, B and C are numerical values and X is film thickness in mils; when A is less than or equal to about 150, B is greater than or equal to about 12.5; and when A is greater than about 150, B is in the range of about −80 to about 40.

FIG. 8 shows the relationship between film density and tear strength at 2 mils for Inventive Films prepared from Compositions A, H, I, J, K, L and M as well as for Comparative Films prepared from Compositions B, C, G and O. FIG. 8 also shows the predicted average (calculated) tear strength for compositions based on a 0.942 g/cc HMW-HDPE resin and a 0.905 g/cc ULDPE resin at blend ratios of 100%/0%, 70%/30%, 80%/20% and 0%/100%, respectively. FIG. 8 indicates whereas the calculated tear strengths of HMW-HDPE/ULDPE blends are similar to the actual tear strengths of linear resins at equivalent densities, the Inventive Films exhibit synergistically superior tear strengths at equivalent densities.

FIG. 9 shows the relationship between film density and tear strength for the most preferred medium modulus, thick film of the present invention (i.e., where Component A has a density greater than about 0.935 g/cc and Component B has a density greater than about 0.901 g/cc) and the same Comparative Films and calculated films of FIG. 8. FIG. 9 shows the most preferred Inventive Film (films prepared from Compositions A, H, J, L and M) is not just synergistically superior, but is also increasingly and exponentially superior at equivalent densities less than about 0.935 g/cc.

FIG. 9 also indicates the that the novel film can be further characterized by the following equation:

tear strength(grams)=$(2.065\times10^6)(Z)^2-(3.8983\times10^6)(Z)+1.84015\times10^6$ where Z is the calculated film density in g/cc.

In another evaluation, Inventive Film Examples 1, 27, 28 and 34 are compared to commercial medium modulus, heavy-duty films used as carpet pad overwraps, insulation sleeves, hot-filled salt bags and lawn and garden bags. Tables 9–11 show these Inventive Films surprisingly exhibit superior property balances at higher film densities and reduced film thicknesses where lower densities and increased thicknesses are ordinarily required for improved properties. As an example of the significant dimensional stability and downgauging improvements and cost savings of the novel film of the present invention relative to a commercial carpet pad overwrap film (Comparative Film 56) Table 9 shows Inventive Film Example 27 exhibits superior tensile yield, ultimate tensile strength and tear strength with equivalent impact strength at about a 33 percent lower film thickness.

TABLE 9

Film Properties of Inventive Films and Commercial Films

| | Comparative Example 55* | Inventive Example 34 | Comparative Example 56* | Inventive Example 27 |
|---|---|---|---|---|
| Film Thickness, mils | 3.0 | 2.99 | 7.0 | 4.73 |
| Film Density, g/cc | 0.921 | 0.930 | 0.922 | 0.942 |
| Tensile Yield, MD/CD, kg | 3.0/2.2 | 3.5/3.5 | 5.0/5.0 | 6.8/7.6 |
| Ultimate Tensile, MD/CD, kg | 6.0/6.0 | 7.3/8.3 | 9.1/9.1 | 13.7/14.6 |
| % Elongation MD/CD | 687/927 | 965/985 | 500/500 | 1345/1380 |
| Dart Impact, Method A, grams | 335 | 550 | 430 | 430 |
| Elmendorf Tear MD/CD, grams | 404/>1,600 | 660/719 | 400/500 | 630/875 |
| Tear Strength, grams | >1002 | 690 | 450 | 728 |

*Comparative Film 55 is a commercial monolayer film consisting of a 60/40 by weight blend of LLDPE and low density polyethylene (LDPE) that is sold into the lawn & garden heavy-duty bag application segment. Comparative Film 56 is a commercial monolayer film consisting of low density polyethylene (LDPE) that is sold into the heavy-duty carpet pad overwrap application segment.

TABLE 10

Film Properties of Inventive Films and Commercial Films

|  | Comparative Example 57* | Inventive Example 1 | Inventive Example 35 | Comparative Example 58* |
|---|---|---|---|---|
| Film Thickness, mils | 7.0 | 5.75 | 4.97 | 7.0 |
| Film Density, g/cc | 0.920 | 0.935 | 0.930 | 0.929 |
| Tensile Yield, MD/CD, kg | 6.2/5.5 | 7.7/7.0 | 5.4/5.9 | 6.2/6.3 |
| Ultimate Tensile, MD/CD, kg | 11.4/10.2 | 15.9/13.8 | 11.1/11.3 | 14.0/12.7 |
| % Elongation MD/CD | 702/962 | 1380/1260 | 1180/1350 | 690/700 |
| Dart Impact, Method A, grams | 350 | 625 | 776 | 760 |
| Elmendorf Tear MD/CD, grams | 687/>1,600 | 1207/1525 | 1336/1490 | 1370/>1600 |
| Tear Strength, grams | ~1,144 | 1,366 | 1,413 | 1,485 |

*Comparative Film 57 is a commercial monolayer film consisting of a 20/80 by weight blend of 100% LLDPE and 100% low density polyethylene (LDPE) that is sold into the heavy-duty bag applications for packaging polymer resins. Comparative Film 58 is a commercial multilayer film consisting of a 25/75 by weight coextrusion of a rubber-modified HDPE coextruded with 50/50 by weight blend of LLDPE and low density polyethylene (LDPE) and is sold into the hot-fill salt bag application segment.

TABLE 11

Film Properties of Inventive Films and Commercial Films

|  | Comparative Example 59* | Inventive Example 27 | Inventive Example 28 | Comparative Example 60* |
|---|---|---|---|---|
| Film Thickness, mils | 5.5 | 4.73 | 7.32 | 8.0 |
| Film Density, g/cc | 0.935 | 0.942 | 0.942 | 0.935 |
| Tensile Yield, MD/CD, kg | 5.9/6.6 | 6.8/7.6 | 10.0/10.5 | 9.6/9.6 |
| Ultimate Tensile, MD/CD, kg | 10.2/8.8 | 13.7/14.6 | 19.0/20.0 | 15.7/11.6 |
| % Elongation MD/CD | 510/625 | 1345/1380 | 1565/1590 | 610/760 |
| Dart Impact, Method A, grams | 365 | 430 | 495 | 475 |
| Elmendorf Tear MD/CD, grams | 820/>1,600 | 630/875 | 1440/>1600 | 1330/>1600 |
| Tear Strength, grams | ~1,210 | 728 | 1,520 | ~1,465 |

*Comparative Films 59 and 60 are commercial multilayer films consisting of a 50/50 by weight coextrusion of polybutylene and HDPE and are sold into the heavy-duty bag insulation sleeve application segment.

We claim:

1. A method for preparing a highly tear resistant medium modulus polyethylene film comprising the steps of:

(1) providing an extrudable thermoplastic composition containing (A) from about 60 to about 95 weight percent, based on the combined weight of components (A) and (B), of at least one high molecular weight linear ethylene polymer having a density in the range of about 0.92 to about 0.96 g/cc and an $I_5$ melt index in the range of about 0.1 to about 3 g/10 minutes, and (B) from about 5 to about 40 weight percent, based on the combined weight of components (A) and (B), of at least one linear ethylene/α-olefin interpolymer containing at least one α-olefin higher than $C_6$ and having a density in the range of about 0.85 to about 0.92 g/cc and an $I_2$ melt index in the range of 0.3 to about 3 g/10 minutes, (2) introducing said composition of step (1) into a heated film extrusion apparatus equipped with an annular die, (3) extruding said composition through said annular die to form a molten or semi-molten thermoplastic tube of said composition that is subsequently blown-up beyond the die diameter and drawn-down through nip and take-off rollers to form a layflat film with a thickness in the range of from about 2 mils to about 8 mils, and (4) conveying said film formed in step (3) for subsequent use down-line of the blown film extrusion apparatus of step (2) or collecting said film formed in step (3) for subsequent use off-line, polymer has an $I_5$ melt index which is 2.34 g/10 min or less, and a density which is 0.30 g/cc or more, than the $I_5$ melt index and density of the at least one linear ethylene/α-olefin interpolymer, wherein neither component (A) or component (B) contains any long chain branching.

2. The method of claim 1 wherein said extrusion apparatus is a variable-stalk extrusion film line.

* * * * *